(12) United States Patent
Yasuda

(10) Patent No.: US 11,179,971 B2
(45) Date of Patent: *Nov. 23, 2021

(54) PNEUMATIC TIRE

(71) Applicant: The Yokohama Rubber Co., LTD., Tokyo (JP)

(72) Inventor: Ryuji Yasuda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 247 days.

This patent is subject to a terminal disclaimer.

(21) Appl. No.: 15/765,551

(22) PCT Filed: Oct. 5, 2016

(86) PCT No.: PCT/JP2016/079699
§ 371 (c)(1),
(2) Date: Apr. 3, 2018

(87) PCT Pub. No.: WO2017/061509
PCT Pub. Date: Apr. 13, 2017

(65) Prior Publication Data
US 2018/0297412 A1 Oct. 18, 2018

(30) Foreign Application Priority Data
Oct. 6, 2015 (JP) .............................. JP2015-198700

(51) Int. Cl.
*B60C 11/01* (2006.01)
*B60C 9/20* (2006.01)
(Continued)

(52) U.S. Cl.
CPC ................ *B60C 11/01* (2013.01); *B60C 3/04* (2013.01); *B60C 9/20* (2013.01); *B60C 9/28* (2013.01);
(Continued)

(58) Field of Classification Search
CPC .... B60C 11/005; B60C 11/01; B60C 11/0008
See application file for complete search history.

(56) References Cited

U.S. PATENT DOCUMENTS 5,373,881 A 12/1994 Enoki
6,192,953 B1 * 2/2001 Fukumoto ............... B60C 11/01
152/209.16
(Continued)

FOREIGN PATENT DOCUMENTS

CN 101875285 11/2010
CN 101895285 11/2010
(Continued)

OTHER PUBLICATIONS

International Search Report for International Application No. PCT/JP2016/079699 dated Jan. 17, 2017, 4 pages, Japan.

*Primary Examiner* — Robert C Dye
*Assistant Examiner* — Farah Taufiq
(74) *Attorney, Agent, or Firm* — Thorpe North & Western

(57) ABSTRACT

In a pneumatic tire are defined: a first imaginary line VL1 passing through a ground contact surface in a meridian cross section of a tread, a second imaginary line VL2 passing through a bottom of a shoulder groove and parallel to VL1, an intersection point P between VL2 and a surface of a shoulder land outward of a ground contact edge T in a lateral direction, and an equatorial plane CL. Given A as a distance in the lateral direction between P and CL, B as a groove depth of the shoulder groove, and C as a distance in the lateral direction between T and CL, $0.80 \leq (B+C)/A \leq 1.15$ is satisfied. Given Q as a distance in the lateral direction between CL and an end of a belt ply that has a shorter dimension in the lateral direction, $0.75 \leq Q/C \leq 0.95$ is satisfied.

20 Claims, 11 Drawing Sheets

(51) Int. Cl.
*B60C 9/28* (2006.01)
*B60C 11/00* (2006.01)
*B60C 3/04* (2006.01)
*B60C 11/03* (2006.01)

(52) U.S. Cl.
CPC ........ *B60C 11/005* (2013.01); *B60C 11/0008* (2013.01); *B60C 2009/2019* (2013.01); *B60C 2009/2022* (2013.01); *B60C 2009/2064* (2013.01); *B60C 2009/2083* (2013.01); *B60C 2011/0016* (2013.01); *B60C 2011/0025* (2013.01); *B60C 2011/0033* (2013.01); *B60C 2011/013* (2013.01); *B60C 2011/039* (2013.01); *B60C 2011/0355* (2013.01); *B60C 2200/06* (2013.01)

(56) References Cited

U.S. PATENT DOCUMENTS

| | | | |
|---|---|---|---|
| 8,813,799 | B2 | 8/2014 | Maruoka |
| 9,283,812 | B2 | 3/2016 | Inoue |
| 10,183,531 | B2 | 1/2019 | Rubber |
| 2010/0269967 | A1* | 10/2010 | Maruoka ............. B60C 11/0306 152/209.16 |
| 2015/0258856 | A1 | 9/2015 | Rubber |
| 2016/0068023 | A1 | 3/2016 | Rubber |

FOREIGN PATENT DOCUMENTS

| | | | |
|---|---|---|---|
| CN | 102712219 | 10/2012 | |
| CN | 104703811 | 6/2015 | |
| CN | 104703815 | 6/2015 | |
| DE | 11 2014 002 102 | 1/2016 | |
| JP | S63-134314 | 6/1988 | |
| JP | H02-270608 | 11/1990 | |
| JP | 2004-322783 | 11/2004 | |
| JP | 2005-212742 | 8/2005 | |
| JP | 2005212742 A * | 8/2005 | |
| JP | 2010-254246 | 11/2010 | |
| WO | WO 2011/065006 | 6/2011 | |
| WO | WO 2014/057552 | 4/2014 | |
| WO | WO 2014/057553 | 4/2014 | |
| WO | WO-2014057552 A1 * | 4/2014 | ............. B60C 3/04 |
| WO | WO 2014/175276 | 10/2014 | |
| WO | WO-2014175276 A1 * | 10/2014 | ......... B60C 11/0008 |
| WO | WO 2014/057553 | 6/2015 | |

\* cited by examiner

| | Description | Conventional Example | Example 1 | Example 2 | Example 3 | Example 4 | Example 5 | Example 6 |
|---|---|---|---|---|---|---|---|---|
| Feature 1 | $0.80 \leq (B+C)/A \leq 1.15$ | 0.70 | 0.80 | 1.00 | 1.15 | 1.00 | 1.00 | 1.00 |
| Feature 23 | $0.75 \leq Q/C \leq 0.95$ | 0.60 | 0.60 | 0.60 | 0.60 | 0.75 | 0.85 | 1.00 |
| Feature 11 | $1.0 \leq N/B \leq 1.4$ | 1.5 | 1.5 | 1.5 | 1.5 | 1.5 | 1.5 | 1.5 |
| Feature 24 | Not directly below groove | NG | NG | NG | NG | NG | NG | NG |
| Feature 14 | $20 \text{ cords} \leq BP \leq 30 \text{ cords}$ | 15 | 15 | 15 | 15 | 15 | 15 | 15 |
| Feature 15 | $5.5 \text{ MPa} \leq Mbp$ | 5.0 | 5.0 | 5.0 | 5.0 | 5.0 | 5.0 | 5.0 |
| Performance index | Belt separation resistance performance | 100 | 100 | 100 | 100 | 103 | 104 | 103 |
| Performance index | Wear resistance performance | 100 | 101 | 102 | 103 | 102 | 102 | 102 |

FIG. 8A

| | Description | Example 7 | Example 8 | Example 9 | Example 10 | Example 11 | Example 12 | Example 13 | Example 14 |
|---|---|---|---|---|---|---|---|---|---|
| Feature 1 | $0.80 \leq (B+C)/A \leq 1.15$ | 1.00 | 1.00 | 1.00 | 1.00 | 1.00 | 1.00 | 1.00 | 1.00 |
| Feature 23 | $0.75 \leq Q/C \leq 0.95$ | 0.85 | 0.85 | 0.85 | 0.85 | 0.85 | 0.85 | 0.85 | 0.85 |
| Feature 11 | $1.0 \leq N/B \leq 1.4$ | 1.0 | 1.2 | 1.4 | 1.2 | 1.2 | 1.2 | 1.2 | 1.2 |
| Feature 24 | Not directly below groove | NG | NG | NG | OK | OK | OK | OK | OK |
| Feature 14 | 20 cords $\leq$ BP $\leq$ 30 cords | 15 | 15 | 15 | 15 | 20 | 25 | 30 | 25 |
| Feature 15 | 5.5 MPa $\leq$ Mbp | 5.0 | 5.0 | 5.0 | 5.0 | 5.0 | 5.0 | 5.0 | 5.8 |
| Performance index | Belt separation resistance performance | 106 | 107 | 106 | 109 | 111 | 113 | 111 | 115 |
| Performance index | Wear resistance performance | 102 | 102 | 102 | 102 | 102 | 102 | 102 | 102 |

FIG. 8B

PNEUMATIC TIRE

TECHNICAL FIELD

The present technology relates to a pneumatic tire.

BACKGROUND ART

In a pneumatic tire, a tread pattern that includes grooves and land portions defined by the grooves is formed. The tread pattern is formed in a tread rubber. The grooves of the tread pattern include a circumferential main groove that extends in a tire circumferential direction, and a lug groove that at least partially extends in a tire lateral direction. A land portion defined by a plurality of the circumferential main grooves is called a rib or a block row. A rib is a continuous land portion not divided by a lug groove. A block row is a discontinuous land portion divided by a lug groove.

In a heavy duty pneumatic tire mounted on a truck or a bus, the performance of the pneumatic tire can be improved by defining a groove depth of a shoulder rib groove and the like (refer to Japanese Unexamined Patent Publication No. 02-270608).

When a heavy duty pneumatic tire swivels or runs onto a curb, the land portion may incur damage or excessive deformation. When the land portion incurs excessive deformation, cracks may occur in an inner surface of the circumferential main groove, and the tread rubber may partially tear off.

SUMMARY

In recent years, there has been increasing demand for a heavy duty pneumatic tire that is a retreaded tire obtained by removing a fixed amount of a surface of the tread rubber that has reached the end of a primary service life thereof, and adhering a new tread rubber thereon to permit tire reuse. To achieve this, improvement of the durability of a belt layer of the pneumatic tire is required. The belt layer is formed by the layering of a plurality of belt plies. In the belt layer, separation (so-called belt separation) that originates at an end portion may occur. To improve the durability of the belt layer, belt separation needs to be suppressed.

The present technology provides a pneumatic tire capable of preventing damage to a tread rubber and capable of improving belt separation resistance performance while suppressing a decrease in wear resistance performance.

According to an aspect of the present technology, a pneumatic tire that rotates about a rotation axis includes a tread portion that includes a tread rubber, side portions provided to both sides in a tire lateral direction of the tread portion, each including a side rubber, a carcass, and a belt layer disposed outward of the carcass in a tire radial direction. The tread portion further includes a plurality of circumferential main grooves provided in the tire lateral direction, each extending in a tire circumferential direction, and a plurality of land portions that are defined by the circumferential main grooves and include a ground contact surface that comes into contact with a road surface. The land portions include a shoulder land portion that is disposed outward in the tire lateral direction of a shoulder main groove that is closest among the plurality of circumferential main grooves to a ground contact edge of the tread portion, and includes the ground contact edge. The shoulder land portion outward of the ground contact edge in the tire lateral direction includes a surface connected to a surface of the side portion. In a meridian cross section of the tread portion that passes through the rotation axis, there are defined a first imaginary line that passes through the ground contact surface, a second imaginary line that passes through a bottom portion of the shoulder main groove and is parallel to the first imaginary line, an intersection point between the second imaginary line and a surface of the shoulder land portion outward of the ground contact edge in the tire lateral direction, and a tire equatorial plane that is orthogonal to the rotation axis and passes through a center of the tread portion in the tire lateral direction. Given A as a distance in the tire lateral direction between the intersection point and the tire equatorial plane, B as a groove depth of the shoulder main groove, and C as a distance in the tire lateral direction between the ground contact edge and the tire equatorial plane, the condition $0.80 \leq (B+C)/A \leq 1.15$ is satisfied. Further, the belt layer includes a plurality of belt plies disposed in the tire radial direction, with two of the belt plies among the plurality of belt plies adjacent in the tire radial direction forming a cross belt ply layer. Then, given Q as a distance in the tire lateral direction between the tire equatorial plane and an end portion of the belt ply that, among the two belt plies that form the cross ply belt layer, has a shorter dimension in the tire lateral direction, the condition $0.75 \leq Q/C \leq 0.95$ is satisfied.

In an aspect of the present technology, given N as a distance in the tire radial direction between the ground contact surface of the shoulder land portion and an end portion of the belt ply that, among the two belt plies that form the cross ply belt layer, is disposed outward in the tire radial direction, preferably the condition $1.0 \leq N/B \leq 1.4$ is satisfied.

In an aspect of the present technology, preferably an end portion of the belt layer in the tire lateral direction is disposed inward or outward of the shoulder main groove in the tire lateral direction.

In an aspect of the present technology, preferably the belt ply includes a plurality of belt cords and a belt rubber that covers the belt cords and, given BP as a number of the belt cords disposed per 50 mm, the condition $20 \text{ cords} \leq BP \leq 30$ cords is satisfied.

In an aspect of the present technology, given Mbp as a modulus at 100% elongation of the belt rubber in a new product, preferably the condition $5.5 \text{ MPa} \leq Mbp$ is satisfied.

In an aspect of the present technology, preferably, there are further defined a third imaginary line that passes through the ground contact edge and the intersection point in the meridian cross section, and a fourth imaginary line that is parallel with the tire equatorial plane and passes through the intersection point and, given θa as an angle formed by the third imaginary line and the fourth imaginary line, and the condition $5° \leq θa \leq 50°$ is satisfied. In an aspect of the present technology, given D as a distance between the tire equatorial plane in the tire lateral direction and an opening end portion outward of the shoulder main groove in the tire lateral direction, preferably, the condition $D/C \leq 0.80$ is satisfied.

In an aspect of the present technology, preferably, the pneumatic tire is a heavy duty tire mounted to a truck or a bus.

According to an aspect of the present technology, a pneumatic tire capable of preventing damage to a tread rubber and capable of improving belt separation resistance performance while suppressing a decrease in wear resistance performance is provided.

BRIEF DESCRIPTION OF DRAWINGS

FIGS. 8A-8B include a table showing evaluation test results of the tire according to the present embodiment.

DETAILED DESCRIPTION

Embodiments according to the present technology will be described with reference to the drawings. However, the present technology is not limited to those embodiments. The constituents of the embodiments described below can be combined with one another as appropriate. In addition, some of the constituents may not be used in some embodiments.

Tire Overview

Figure 1:
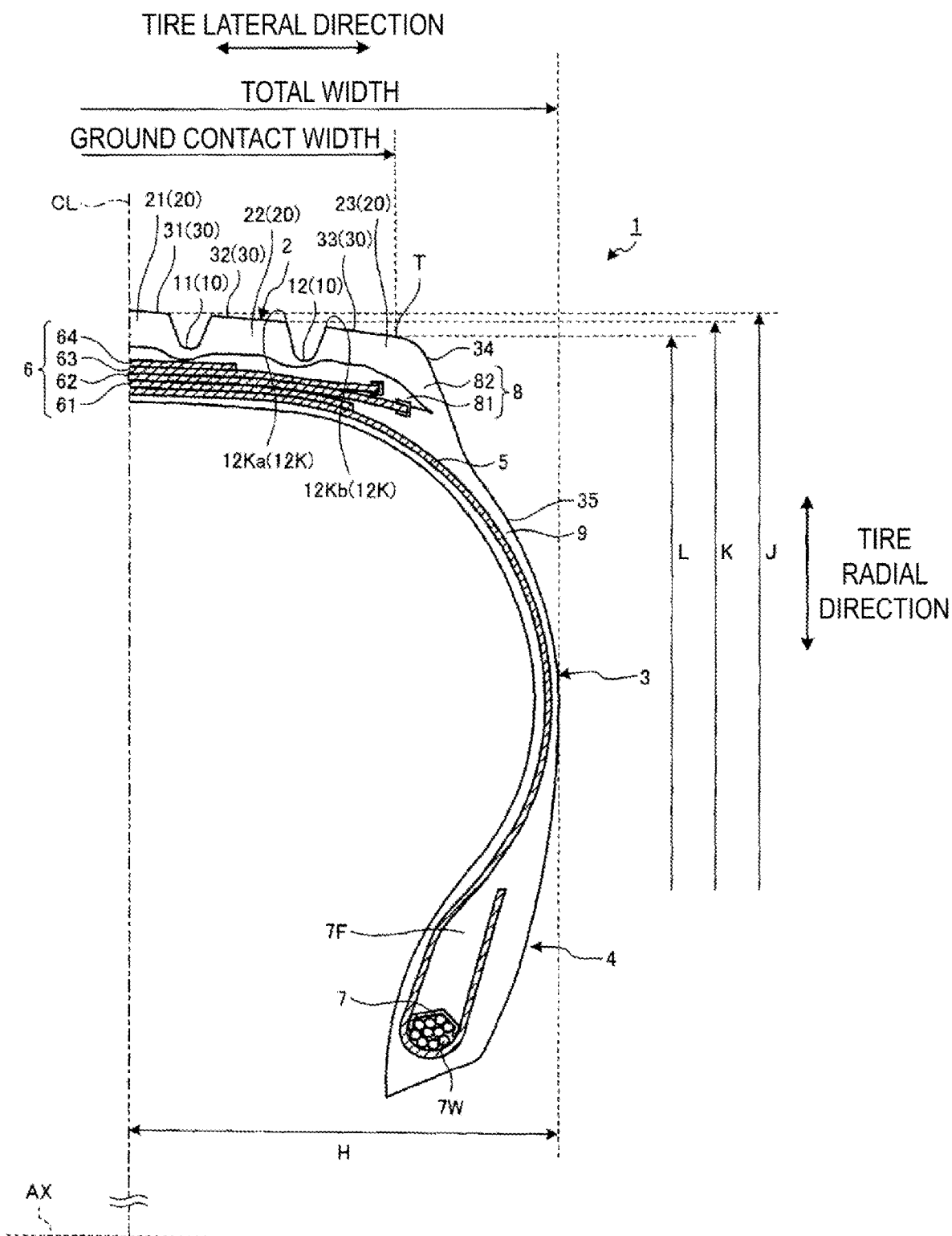
FIG. 1 is a meridian cross-sectional view of an example of a tire according to the present embodiment.

FIG. 1 is a cross-sectional view illustrating an example of a tire 1 according to the present embodiment. The tire 1 is a pneumatic tire. The tire 1 is a heavy duty tire mounted on a truck or a bus. A tire for a truck or a bus (a heavy duty tire) is a tire as specified in the JATMA Year Book published by the Japan Automobile Tire Manufacturers Association, Inc. (JATMA), Chapter C. Note that the tire 1 may be mounted on a passenger vehicle or to a light truck.

The tire 1 rotates about the rotation axis AX and runs on a road surface while mounted on a vehicle such as a truck or a bus.

In the description below, a direction parallel with the rotation axis AX of the tire 1 is suitably referred to as a tire lateral direction, a radiation direction with respect to the rotation axis AX of the tire 1 is suitably referred to as a tire radial direction, and a rotation direction about the rotation axis AX of the tire 1 is suitably referred to as a tire circumferential direction.

Further, in the description below, a flat plane that is orthogonal to the rotation axis AX and passes through a center in the tire lateral direction of the tire 1 is suitably referred to as a tire equatorial plane CL. Further, a center line where the tire equatorial plane CL and a surface of a tread portion 2 of the tire 1 intersect is suitably referred to as a tire equator line.

Further, in the description below, a position or a direction away from the tire equatorial plane CL in the tire lateral direction is suitably referred to as outward in the tire lateral direction, a position near or a direction approaching the tire equatorial plane CL in the tire lateral direction is suitably referred to as inward in the tire lateral direction, a position or a direction away from the rotation axis AX in the tire radial direction is suitably referred to as outward in the tire radial direction, and a position near or a direction approaching the rotation axis AX in the tire radial direction is suitably referred to as inward in the tire radial direction.

Further, in the description below, an inner side in a vehicle lateral direction is suitably referred to as a vehicle inner side, and an outer side in the vehicle lateral direction is suitably referred to as a vehicle outer side. The vehicle inner side refers to a position near or a direction approaching a center of the vehicle in the vehicle lateral direction. The vehicle outer side refers to a position or a direction away from the center of the vehicle in the vehicle lateral direction.

FIG. 1 illustrates a meridian cross section passing through the rotation axis AX of the tire 1. FIG. 1 illustrates a cross section of the tire 1 on a first side of the tire equatorial plane CL in the tire lateral direction. The tire 1 has a structure and a shape symmetrical with respect to the tire equatorial plane CL in the tire lateral direction.

As illustrated in FIG. 1, the tire 1 includes the tread portion 2 on which a tread pattern is formed, side portions 3 provided to both sides in the tire lateral direction of the tread portion 2, and bead portions 4 connected to the side portions 3. With the running of the tire 1, the tread portion 2 comes into contact with a road surface.

Further, the tire 1 includes a carcass 5, a belt layer 6 disposed outward of the carcass 5 in the tire radial direction, and a bead core 7. The carcass 5, the belt layer 6, and the bead core 7 function as a reinforcing member (frame member) of the tire 1.

Further, the tire 1 includes a tread rubber 8 and a side rubber 9. The tread portion 2 includes the tread rubber 8. The side portion 3 includes the side rubber 9. The tread rubber 8 is disposed outward of the belt layer 6 in the tire radial direction.

The carcass 5 is a reinforcing member that forms a framework of the tire 1. The carcass 5 functions as a pressure vessel when the tire 1 is filled with air. The carcass 5 includes a plurality of carcass cords of organic fibers or steel fibers, and a carcass rubber that covers the carcass cords. The carcass 5 is supported by the bead core 7 of the bead portion 4. The bead core 7 is disposed on a first side and a second side of the carcass 5 in the tire lateral direction. The carcass 5 is folded back at the bead core 7.

The belt layer 6 is a reinforcing member that holds the shape of the tire 1. The belt layer 6 is disposed between the carcass 5 and the tread rubber 8 in the tire radial direction. The belt layer 6 tightens the carcass 5. The rigidity of the carcass 5 is increased by the tightening force applied by the belt layer 6. Further, the belt layer 6 absorbs the shock of the running of the tire 1, protecting the carcass 5. For example, even in a case where the tread portion 2 is damaged, damage to the carcass 5 is prevented by the belt layer 6.

The belt layer 6 includes a plurality of belt plies disposed in the tire radial direction. In the present embodiment, the belt layer 6 is a so-called four-layer belt and includes four belt plies. Each belt ply includes a first belt ply 61 disposed most inward in the tire radial direction, a second belt ply 62 disposed inward in the tire radial direction following the first belt ply 61, a third belt ply 63 disposed inward in the tire radial direction following the second belt ply 62, and a fourth belt ply 64 disposed most outward in the tire radial direction. The first belt ply 61 and the second belt ply 62 are adjacent to each other. The second belt ply 62 and the third belt ply 63 are adjacent to each other. The third belt ply 63 and the fourth belt ply 64 are adjacent to each other.

The dimensions of the belt plies 61, 62, 63, 64 in the tire lateral direction are different. In the tire lateral direction, the dimension of the second belt ply 62 is largest, the dimension of the third belt ply 63 is the next largest following the second belt ply 62, the dimension of the first belt ply 61 is the next largest following the third belt ply 63, and the dimension of the fourth belt ply 64 is the smallest.

The belt plies 61, 62, 63, 64 include a plurality of belt cords of metal fibers, and a belt rubber that covers the belt cords. The second belt ply 62 and the third belt ply 63 adjacent in the tire radial direction form a cross ply belt layer. The second belt ply 62 and the third belt ply 63 are disposed so that the belt cords of the second belt ply 62 and the belt cords of the third belt ply 63 intersect.

The bead portions 4 are reinforcing members that fix both end portions of the carcass 5. The bead core 7 supports the carcass 5 onto which tension is applied by an internal pressure of the tire 1. The bead portion 4 includes the bead core 7 and a bead filler rubber 7F. The bead core 7 is a member wrapped by a bead wire 7W into a ring shape. The bead wire 7W is a steel wire.

The bead filler rubber 7F fixes the carcass 5 to the bead core 7. Further, the bead filler rubber 7F establishes the shape of the bead portion 4, and increases the rigidity of the bead portion 4. The bead filler rubber 7F is disposed in a space formed by the carcass 5 to the bead core 7. The bead filler rubber 7F is disposed in a space formed by the fold-back of an end portion of the carcass 5 in the tire lateral direction at the position of the bead core 7. The bead core 7 and the bead filler rubber 7F are disposed in a space formed by the fold-back of the carcass 5.

The tread rubber 8 protects the carcass 5. The tread rubber 8 includes an undertread rubber 81 and a cap tread rubber 82. The undertread rubber 81 is disposed outward of the belt layer 6 in the tire radial direction. The cap tread rubber 82 is provided outward of the undertread rubber 81 in the tire radial direction. The tread pattern is formed in the cap tread rubber 82.

The side rubber 9 protects the carcass 5. The side rubber 9 is connected to the cap tread rubber 82.

The tread portion 2 includes a plurality of circumferential main grooves 10 in the tire lateral direction, each extending in the tire circumferential direction, and a plurality of land portions 20 defined by the circumferential main grooves 10 and including a ground contact surface that comes into contact with the road surface. The circumferential main grooves 10 and the land portions 20 are formed in the cap tread rubber 82 of the tread rubber 8. The land portion 20 includes a ground contact surface 30 contactable with the road surface with the running of the tire 1.

The circumferential main groove 10 extends in the tire circumferential direction. The circumferential main groove 10 is substantially parallel with the tire equator line. The circumferential main groove 10 extends linearly in the tire circumferential direction. Note that the circumferential main groove 10 may be provided in a wave-like shape or a zigzag shape in the tire circumferential direction.

Four of the circumferential main grooves 10 are provided in the tire lateral direction. The circumferential main groove 10 includes a center main groove 11 provided, one on each of both sides in the tire lateral direction with respect to the tire equatorial plane CL, and a shoulder main groove 12 provided outward of each of the center main grooves 11 in the tire lateral direction.

Five land portions 20 are provided in the tire lateral direction. The land portion 20 includes a center land portion 21 provided between a pair of the center main grooves 11, a second land portion 22 provided between the center main groove 11 and the shoulder main groove 12, and a shoulder land portion 23 provided outward of the shoulder main groove 12 in the tire lateral direction.

The center land portion 21 includes the tire equatorial plane CL. The tire equatorial plane CL (tire equator line) passes through the center land portion 21. The second land portion 22 is provided on both sides of the tire equatorial plane CL in the tire lateral direction, one on each side. The shoulder land portion 23 is provided on both sides of the tire equatorial plane CL in the tire lateral direction, one on each side.

The ground contact surface 30 of the land portion 20 that can come into contact with the road surface includes a ground contact surface 31 of the center land portion 21, a ground contact surface 32 of the second land portion 22, and a ground contact surface 33 of the shoulder land portion 23.

The fourth belt ply 64 is partially disposed directly below the center main groove 11. The fourth belt ply 64 is not disposed directly below the shoulder main groove 12. The third belt ply 63 is disposed directly below the shoulder main groove 12. Note that "directly below" refers to the same position in the tire lateral direction, inward in the tire radial direction.

Definitions of Terms

Figure 2:
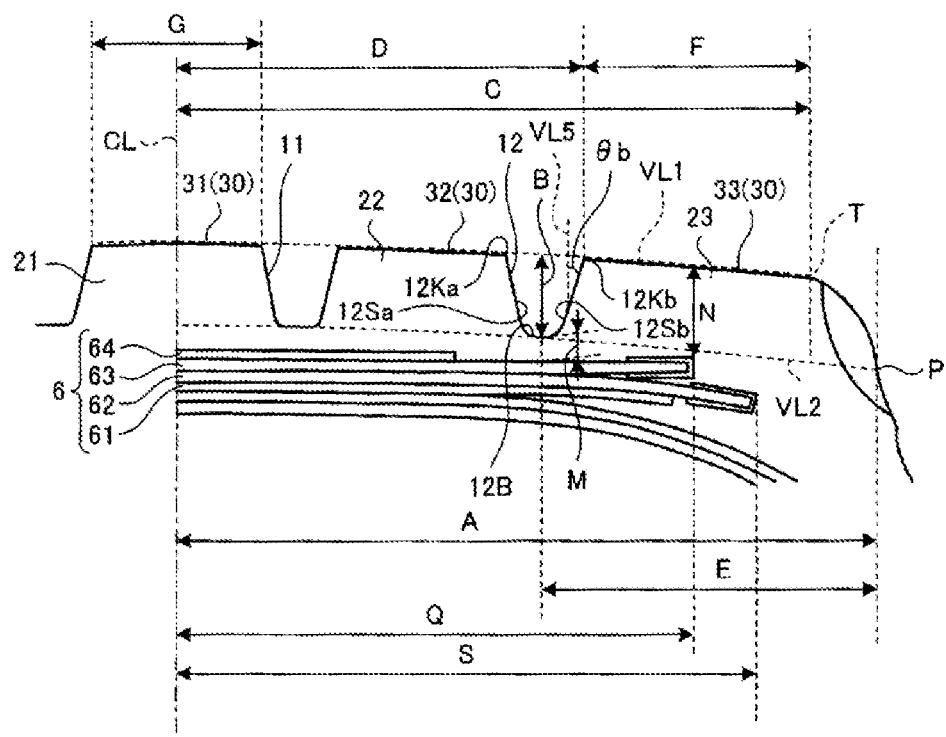
FIG. 2 is a meridian cross-sectional view of a tread portion according to the present embodiment.
Figure 3:
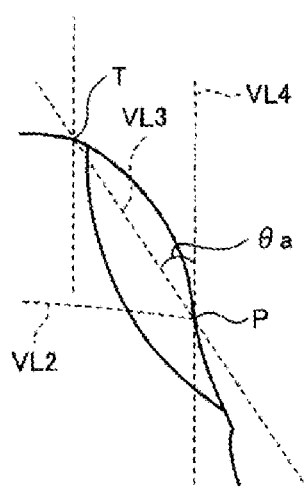
FIG. 3 is an enlarged view of a portion of FIG. 2.
Figure 4:
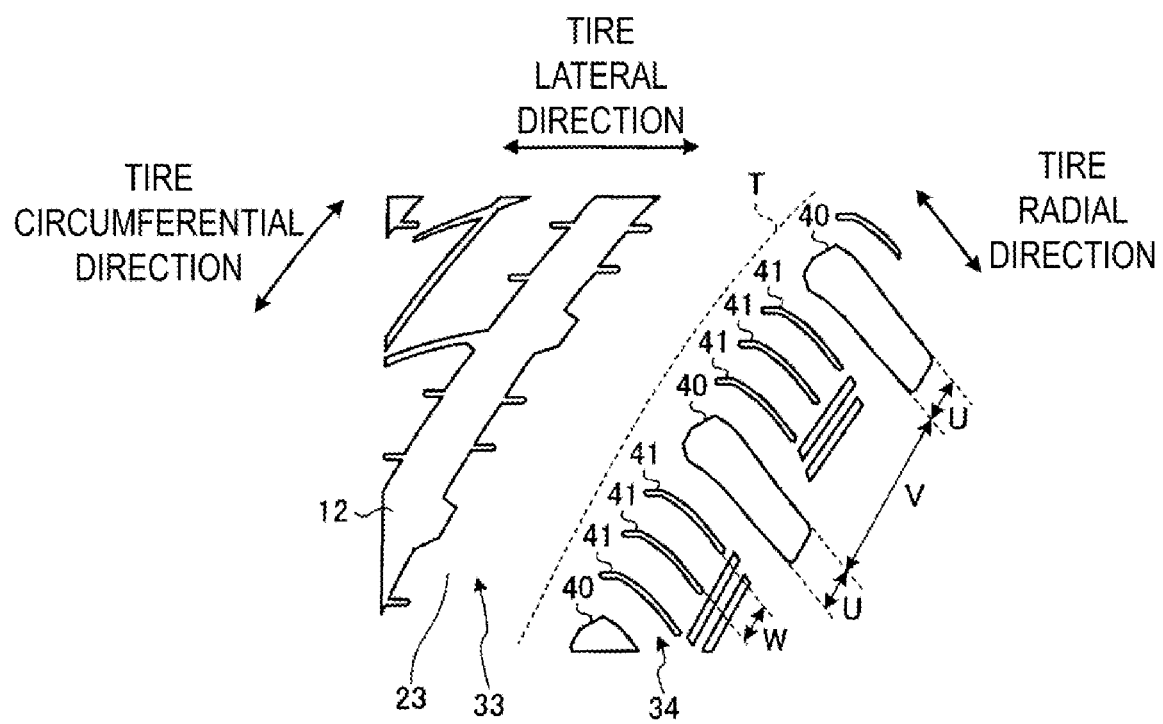
FIG. 4 is a perspective view illustrating a portion of the tire according to the present embodiment.
Figure 5:
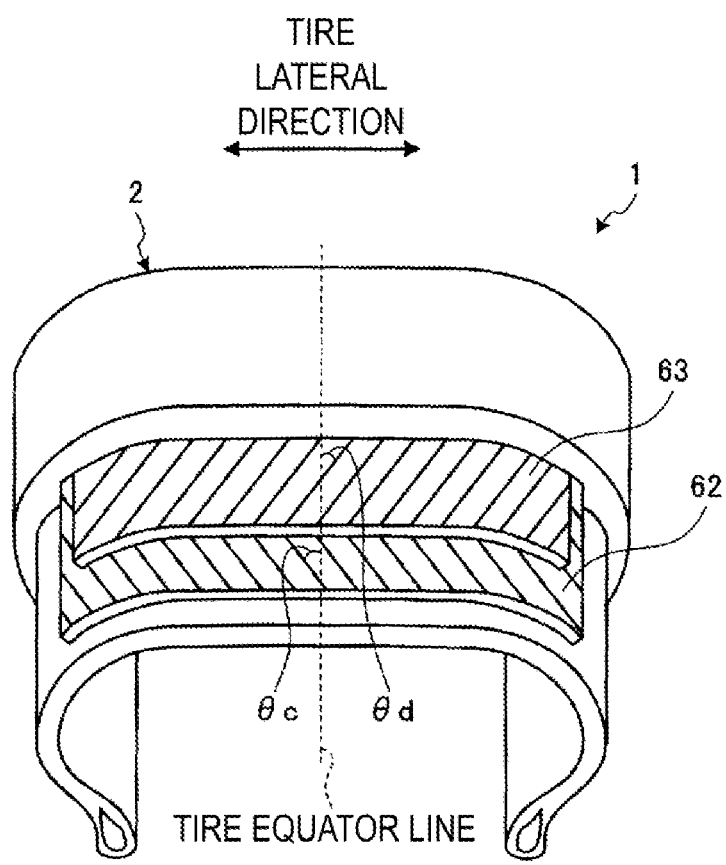
FIG. 5 is a schematic diagram in which a portion of the tire according to the present embodiment is partly cut away.

Next, the terminology used in the present specification will be described with reference to FIGS. 1 to 5. FIG. 2 is a diagram illustrating the meridian cross section of the tread portion 2 according to the present embodiment. FIG. 3 is an enlarged view of a portion of FIG. 2. FIG. 4 is a perspective view illustrating a portion of the tire 1 according to the present embodiment. FIG. 5 is a schematic diagram illustrating a portion of the tire 1 according to the present embodiment cut away. The meridian cross section of the tread portion 2 refers to a cross section that passes through the rotation axis AX and is parallel with the rotation axis AX. The tire equatorial plane CL passes through the center of the tread portion 2 in the tire lateral direction.

As defined in Chapter G in the JATMA Year Book, an outer diameter of the tire 1 refers to the outer diameter of the tire 1 mounted to an applicable rim, filled to a specified air pressure, and in an unloaded state.

As defined in Chapter G in the JATMA Year Book, a total width of the tire 1 refers to a linear distance between the side portions including the design, alphanumerics, and the like of the side surface of the tire 1 mounted to an applicable rim, filled to a specified air pressure, and in an unloaded state. That is, the total width of the tire 1 refers to the distance between an area on the outermost side of the structure that constitutes the tire 1 disposed on a first side of the tire equatorial plane CL in the tire lateral direction, and an area on the outermost side of the structure that constitutes the tire 1 disposed on a second side.

Further, as defined in Chapter G in the JATMA Year Book, a tread width of the tread portion 2 refers to a linear distance between both ends of the tread design section of the tire 1 mounted to an applicable rim, filled to a specified air pressure, and in an unloaded state.

Further, as defined in Chapter G in the JATMA Year Book, a ground contact width of the tread portion 2 refers to a maximum linear distance in a tire axial direction (tire lateral direction) of the ground contact surface with a flat plate when the tire 1 is mounted to an applicable rim, filled to a specified air pressure, and statically placed orthogonal to the flat plate. That is, the ground contact width of the tread portion 2 refers to a distance between a ground contact edge T of the tread portion 2 on a first side and the ground contact edge T of the tread portion 2 on a second side of the tire equatorial plane CL in the tire lateral direction.

The ground contact edge T of the tread portion 2 refers to an end portion in the tire lateral direction of a section that comes into contact with a flat plate when the tire 1 is mounted to an applicable rim, filled to a specified air pressure, statically placed orthogonal to the flat plate, and subjected to a load corresponding to the specified weight.

The circumferential main groove 10 of the plurality of circumferential main grooves 10 that is closest to the ground contact edge T of the tread portion 2 is the shoulder main groove 12. The shoulder land portion 23 is disposed outward of the shoulder main groove 12 in the tire lateral direction. The land portion 20 of the plurality of land portions 20 that is closest to the ground contact edge T of the tread portion 2 is the shoulder land portion 23. The shoulder land portion 23 includes the ground contact edge T. That is, the ground contact edge T is provided to the shoulder land portion 23. The land portion 20 of the plurality of land portions 20 that is closest to the tire equatorial plane CL of the tread portion 2 is the center land portion 21. The center land portion 21 includes the tire equatorial plane CL. The tire equatorial plane CL passes through the center land portion 21.

Note that the terms described below are defined under the conditions of a new tire 1 being mounted to an applicable rim, filled to a specified air pressure, and in an unloaded state. Further, as described above, the ground contact width and the ground contact edge T are dimensions and positions measured when the tire 1 is mounted to an applicable rim, filled to a specified air pressure, statically placed orthogonal to a flat plate, and subjected to a load corresponding to the specified weight. The ground contact edge T is measured when a load corresponding to the specified mass is applied, and the position of the measured ground contact edge T is on the surface of the tread portion 2 in an unloaded state.

The surface of the shoulder land portion 23 includes the ground contact surface 33 disposed inward of the ground contact edge T in the tire lateral direction, and a side surface 34 disposed outward of the ground contact edge T in the tire lateral direction. The ground contact surface 33 and the side surface 34 are disposed on the cap tread rubber 82 of the tread rubber 8. The ground contact surface 33 and the side surface 34 are connected via a corner portion formed on the cap tread rubber 82. The ground contact surface 33 is substantially parallel with the rotation axis AX (road surface). The side surface 34 intersects the axis parallel with the rotation axis AX. An angle formed by the road surface and the side surface 34 is substantially greater than 45°, and an angle formed by the ground contact surface 33 and the side surface 34 is substantially greater than 225°. The side surface 34 of the shoulder land portion 23 and the surface 35 of the side portion 3 face substantially the same direction. The side surface 34 of the shoulder land portion 23 outward of the ground contact edge T in the tire lateral direction is connected to the surface 35 of the side portion 3.

The shoulder main groove 12 includes an inner surface. An opening end portion 12K is provided outward of the inner surface of the shoulder main groove 12 in the tire radial direction. The opening end portion 12K is a boundary portion between the shoulder main groove 12 and the ground contact surface 30. The opening end portion 12K includes an opening end portion 12Ka inward in the tire lateral direction, and an opening end portion 12Kb outward in the tire lateral direction.

The inner surface of the shoulder main groove 12 includes a bottom portion 12B and a side wall portion 12S that connects the opening end portion 12K and the bottom portion 12B. The side wall portion 12S of the shoulder main groove 12 includes a side wall portion 12Sa inward in the tire lateral direction, and a side wall portion 12Sb outward in the tire lateral direction. The side wall portion 12Sa connects the opening end portion 12Ka and the bottom portion 12B. The side wall portion 12Sb connects the opening end portion 12Kb and the bottom portion 12B. The opening end portion 12Ka is a boundary portion between the side wall portion 12Sa and the ground contact surface 32. The opening end portion 12Kb is a boundary portion between the side wall portion 12Sb and the ground contact surface 33.

The bottom portion 12B of the shoulder main groove 12 refers to the area on the inner surface of the shoulder main groove 12 that is farthest from the opening end portion 12K of the shoulder main groove 12 in the tire radial direction. That is, the bottom portion 12B of the shoulder main groove 12 refers to the deepest area in the shoulder main groove 12. The bottom portion 12B can also be referred to as the area on the inner surface of the shoulder main groove 12 that is closest to the rotation axis AX.

As illustrated in FIG. 2, in the meridian cross section of the tread portion 2, the bottom portion 12B of the shoulder main groove 12 has an arc shape. In the meridian cross section of the tread portion 2, the side wall portion 12Sa inclines inward in the tire lateral direction toward an outer side in the tire radial direction. The side wall portion 12Sb inclines outward in the tire lateral direction toward an outer side in the tire radial direction.

As illustrated in FIG. 2, in the meridian cross section of the tread portion 2, an imaginary line that passes through the ground contact surface 30 of the land portion 20 is defined as a first imaginary line VL1. The first imaginary line VL1 indicates a profile of the ground contact surface 30 of the tire 1 when the tire 1 is mounted to an applicable rim, filled to a specified air pressure, and in an unloaded state.

As illustrated in FIG. 2, in the meridian cross section of the tread portion 2, an imaginary line that passes through the bottom portion 12B of the shoulder main groove 12 and is parallel with the first imaginary line VL1 is defined as a second imaginary line VL2. That is, the second imaginary line VL2 is an imaginary line obtained by moving the first imaginary line VL1 in parallel inward in the tire radial direction until the first imaginary line VL1 is disposed on the bottom portion 12B of the shoulder main groove 12, with the tire 1 mounted to an applicable rim, filled to a specified air pressure, and in an unloaded state.

As illustrated in FIG. 2, in the meridian cross section of the tread portion 2, an intersection point of the second imaginary line VL2 and the side surface 34 of the shoulder land portion 23 outward of the ground contact edge Tin the tire lateral direction is defined as an intersection point P. The intersection point P is an intersection point of the second imaginary line VL2 and the side surface 34 when the tire 1 is mounted to an applicable rim, filled to a specified air pressure, and in an unloaded state.

As illustrated in FIG. 2, in the meridian cross section of the tread portion 2, a distance between the tire equatorial plane CL and the intersection point P in the tire lateral direction is defined as a distance A. The distance A is a distance between the tire equatorial plane CL and the intersection point P when the tire 1 is mounted to an applicable rim, filled to a specified air pressure, and in an unloaded state.

As illustrated in FIG. 2, in the meridian cross section of the tread portion 2, a groove depth of the shoulder main groove 12 is defined as a groove depth B. The groove depth B is a distance between the bottom portion 12B of the shoulder main groove 12 and the opening end portion 12K of the shoulder main groove 12 in the tire radial direction when the tire 1 is mounted to an applicable rim, filled to a specified air pressure, and in an unloaded state. Note that when the opening end portion 12Ka and the opening end portion 12Kb of the shoulder main groove 12 differ in position in the tire radial direction, the distance between the opening end portion 12K among the two opening end portions 12Ka, 12Kb that is farther away from the rotation axis AX and the bottom portion 12B of the shoulder main groove 12 may be set as the groove depth B. Or, the distance between the opening end portion 12Kb outward in the tire radial direction and the bottom portion 12B of the shoulder main groove 12 may be set as the groove depth B. Or, an average value of the distance between the opening end portion 12Ka and the bottom portion 12B, and the distance between the opening end portion 12Kb and the bottom portion 12B in the tire radial direction may be set as the groove depth B. Note that when the positions of the opening end portion 12Ka and the opening end portion 12Kb in the tire radial direction are substantially equal, the distance between the opening end portion 12K of the two opening end portions 12Ka, 12Kb and the bottom portion 12B of the shoulder main groove 12 may be set as the groove depth B.

Note that the positions of the opening end portion 12Ka and the position of the opening end portion 12Kb in the tire radial direction are substantially equal when the tire 1 is mounted to an applicable rim, filled to a specified air pressure, statically placed orthogonal to a flat plate, and subjected to a load corresponding to the specified weight are substantially equal. The distance between the opening end portion 12Ka or the opening end portion 12Kb and the bottom portion 12B in the tire radial direction when the tire 1 is mounted to an applicable rim, filled to a specified air pressure, statically placed orthogonal to a flat plate, and subjected to a load corresponding to a specified weight may be defined as the groove depth B.

As illustrated in FIG. 2, in the meridian cross section of the tread portion 2, a distance between the tire equatorial plane CL and the ground contact edge T in the tire lateral direction is defined as a distance C. The position of the ground contact edge T is specified by measuring the position when a load corresponding to a specified weight is applied, and positioning the measured position on the surface of the tread portion 2 in an unloaded state. The distance C is a distance between the tire equatorial plane CL and the plotted ground contact edge T when the tire 1 is mounted to an applicable rim, filled to a specified air pressure, and in an unloaded state. The distance C is a value equivalent to half of the ground contact width.

As illustrated in FIG. 2, in the meridian cross section of the tread portion 2, a distance between the tire equatorial plane CL in the tire lateral direction and the opening end portion 12Kb outward of the shoulder main groove 12 in the tire lateral direction is defined as a distance D. The distance D is a distance between the tire equatorial plane CL and the opening end portion 12Kb when the tire 1 is mounted to an applicable rim, filled to a specified air pressure, and in an unloaded state.

As illustrated in FIG. 3, in the meridian cross section of the tread portion 2, an imaginary line that passes through the ground contact edge T and the intersection point P is defined as a third imaginary line VL3. The third imaginary line VL3 is a straight line that passes through the ground contact edge T and the intersection point P when the tire 1 is mounted to an applicable rim, filled to a specified air pressure, and in an unloaded state.

As illustrated in FIG. 3, in the meridian cross section of the tread portion 2, an imaginary line that is parallel with the tire equatorial plane CL and passes through the intersection point P is defined as a fourth imaginary line VL4. The fourth imaginary line VL4 is a straight line that passes through the intersection point P when the tire 1 is mounted to an applicable rim, filled to a specified air pressure, and in an unloaded state.

As illustrated in FIG. 3, in the meridian cross section of the tread portion 2, an angle formed by the third imaginary line VL3 and the fourth imaginary line VL4 is defined as an angle $\theta a$.

As illustrated in FIG. 2, in the meridian cross section of the tread portion 2, a distance between the bottom portion 12B of the shoulder main groove 12 and the intersection point P in the tire lateral direction is defined as a distance E. The distance E is a distance between the bottom portion 12B and the intersection point P when the tire 1 is mounted to an applicable rim, filled to a specified air pressure, and in an unloaded state.

As illustrated in FIG. 2, in the meridian cross section of the tread portion 2, an imaginary line that passes through the side wall portion 12Sb and is parallel with the tire equatorial plane CL is defined as a fifth imaginary line VL5. The fifth imaginary line VL5 is a straight line that passes through the side wall portion 12Sb when the tire 1 is mounted to an applicable rim, filled to a specified air pressure, and in an unloaded state.

As illustrated in FIG. 2, in the meridian cross section of the tread portion 2, the side wall portion 12Sb inclines outward in the tire lateral direction toward an outer side in the tire radial direction with respect to the fifth imaginary line VL5. In the meridian cross section of the tread portion 2, an angle formed by the fifth imaginary line VL5 and the side wall portion 12Sb outward of the shoulder main groove 12 in the tire lateral direction is defined as an angle $\theta b$.

As illustrated in FIG. 2, in the meridian cross section of the tread portion 2, a distance between the opening end portion 12Kb outward of the shoulder main groove 12 in the tire lateral direction and the ground contact edge T in the tire lateral direction is defined as a distance F. The distance F is the dimension of the ground contact surface 33 of the shoulder land portion 23 in the tire lateral direction. The distance F is a distance between the opening end portion 12Kb and the ground contact edge T when the tire 1 is mounted to an applicable rim, filled to a specified air pressure, and in an unloaded state.

As illustrated in FIG. 2, in the meridian cross section of the tread portion 2, a dimension of the center land portion 21 in the tire lateral direction is defined as a dimension G. The dimension G is a dimension of the center land portion 21 when the tire 1 is mounted to an applicable rim, filled to a specified air pressure, and in an unloaded state. The dimension G is the dimension of the ground contact surface 31 of the center land portion 21 in the tire lateral direction.

As illustrated in FIG. 1, in the meridian cross section of the tread portion 2, a distance in the tire lateral direction between the tire equatorial plane CL and the area of the side portion 3 most outward in the tire lateral direction is defined as a distance H. The distance H is a distance between the tire equatorial plane CL and the area of the side portion 3 most outward in the tire lateral direction when the tire 1 is mounted to an applicable rim, filled to a specified air pressure, and in an unloaded state. The distance H is a value equivalent to half of the total width.

As illustrated in FIG. 1, in the meridian cross section of the tread portion 2, a tire outer diameter in the tire equatorial plane CL is defined as a tire outer diameter J. The tire outer diameter J is a diameter of the tire 1 in the tire equatorial plane CL when the tire 1 is mounted to an applicable rim, filled to a specified air pressure, and in an unloaded state.

As illustrated in FIG. 1, in the meridian cross section of the tread portion 2, a tire outer diameter of the opening end portion 12Ka inward of the shoulder main groove 12 in the tire lateral direction is defined as a tire outer diameter K. The tire outer diameter K is the diameter of the tire 1 at the opening end portion 12Ka when the tire 1 is mounted to an applicable rim, filled to a specified air pressure, and in an unloaded state.

As illustrated in FIG. 1, in the meridian cross section of the tread portion 2, a tire outer diameter at the ground contact edge T is defined as a tire outer diameter L. The tire outer diameter L is a diameter of the tire 1 at the ground contact edge T when the tire 1 is mounted to an applicable rim, filled to a specified air pressure, and in an unloaded state.

As illustrated in FIG. 2, in the meridian cross section of the tread portion 2, a distance between the bottom portion 12B of the shoulder main groove 12 and the belt layer 6 in the tire radial direction is defined as a distance M. In the present embodiment, the third belt ply 63 is disposed directly below the bottom portion 12B of the shoulder main groove 12. The distance M is a distance between the bottom portion 12B of the shoulder main groove 12 and the third belt ply 63 disposed directly below the bottom portion 12B when the tire 1 is mounted to an applicable rim, filled to a specified air pressure, and in an unloaded state.

As illustrated in FIG. 2, in the meridian cross section of the tread portion 2, a distance in the tire radial direction between the ground contact surface 33 of the shoulder land portion 23 and the end portion of the third belt ply 63 that, among the second belt ply 62 and the third belt ply 63 that form the cross ply belt layer, is disposed outward in the tire radial direction is defined as a distance N. The distance N is a distance in the tire radial direction between the end portion of the third belt ply 63 in the tire lateral direction and an area of the ground contact surface 33 that is directly above the end portion of the third belt ply 63 when the tire 1 is mounted to an applicable rim, filled to a specified air pressure, and in an unloaded state.

As illustrated in FIG. 2, in the meridian cross section of the tread portion 2, a distance in the tire lateral direction between the tire equatorial plane CL and the end portion of the third belt ply 63 having, among the second belt ply 62 and the third belt ply 63 which form the cross ply belt layer, a short dimension in the tire lateral direction is defined as a distance Q. The distance Q is a distance in the tire lateral direction between the tire equatorial plane CL and the end portion of the third belt ply 63 in the tire lateral direction when the tire 1 is mounted to an applicable rim, filled to a specified air pressure, and in an unloaded state.

As illustrated in FIG. 2, in the meridian cross section of the tread portion 2, a distance in the tire lateral direction between the tire equatorial plane CL and the end portion of the second belt ply 62 that, among the plurality of belt plies 61, 62, 63, 64, has the longest dimension in the tire lateral direction is defined as a distance S. The distance S is a distance in the tire lateral direction between the tire equatorial plane CL and the end portion of the second belt ply 62 in the tire lateral direction when the tire 1 is mounted to an applicable rim, filled to a specified air pressure, and in an unloaded state.

As illustrated in FIG. 4, in the side surface 34 of the shoulder land portion 23 outward of the ground contact edge T in the tire lateral direction, a plurality of recessed portions 40 are provided in the tire circumferential direction. The recessed portions 40 are lug grooves formed in the side surface 34. The recessed portions 40 extend in the tire radial direction.

As illustrated in FIG. 4, a dimension of the recessed portion 40 in the tire circumferential direction is defined as a dimension U. The dimension U of the recessed portion 40 is a dimension when the tire 1 is mounted to an applicable rim, filled to a specified air pressure, and in an unloaded state. The dimension of the recessed portion 40 in the tire circumferential direction is less than a dimension of the recessed portion 40 in the tire radial direction.

As illustrated in FIG. 4, a dimension between the recessed portions 40 adjacent in the tire circumferential direction is defined as a dimension V. The dimension V is a dimension of the space between adjacent recessed portions 40 when the tire 1 is mounted to an applicable rim, filled to a specified air pressure, and in an unloaded state. The dimension V is greater than the dimension U.

As illustrated in FIG. 4, in the side surface 34 of the shoulder land portion 23, a plurality of sipes 41 are provided in the tire circumferential direction. The sipes 41 each have a groove depth less than that of the recessed portion 40 (lug groove) as well as a small groove width. The sipes 41 extend in the tire radial direction. A plurality of the sipes 41 are provided between the recessed portions 40 adjacent to each other in the tire circumferential direction.

As illustrated in FIG. 4, a dimension between the sipes 41 adjacent in the tire circumferential direction is defined as a dimension W. The dimension W is a dimension of the space between the sipes 41 adjacent to each other when the tire 1 is mounted to an applicable rim, filled to a specified air pressure, and in an unloaded state. The dimension W is less than the dimension of the sipe 41 in the tire radial direction.

Note that the lug groove (recessed portion) 40 refers to a groove in which the groove opening is maintained even upon ground contact when the lug groove is assumed to have come into contact with the ground. The sipe 41 refers to a groove in which the opening of the sipe 41, when the sipe 41 is assumed to have come into contact with the ground, is blocked and not maintained.

As illustrated in FIG. 5, the inclination direction of the belt cords of the second belt ply 62 and the inclination direction of the belt cords of the third belt ply 63 with respect to the tire equator line are different. The belt cords of the second belt ply 62 incline to a first side in the tire lateral direction, toward a first side in the tire circumferential direction. The belt cords of the third belt ply 63 incline to a second side in the tire lateral direction, toward the first side in the tire circumferential direction.

An inclination angle of the belt cords of the second belt ply 62 with respect to the tire equator line is defined as an angle θc. Further, an inclination angle of the belt cords of the third belt ply 63 with respect to the tire equator line is defined as an angle θd.

Explanation of Features

Next, features of the tire 1 according to the present embodiment will be described. The tire 1 has a plurality of features. Each feature will be described in order.

Feature 1

The condition below is satisfied:

$$0.80 \leq (B+C)/A \leq 1.15 \tag{1A}$$

More preferably, the condition below is satisfied:

$$0.80 \leq (B+C)/A \leq 1.05 \tag{1B}$$

When the tire 1 swivels or runs onto a curb and deforms, expanding the shoulder main groove 12 and causing the shoulder land portion 23 to become outwardly displaced in the tire lateral direction, the value (B+C) approaches the value A in accordance with the groove depth B. Feature 1 defines the level of closeness between the distance A and the sum of the groove depth B and the distance C when the shoulder land portion 23 is outwardly displaced in the tire lateral direction.

Feature 2

The condition below is satisfied:

$$5° \leq \theta a \leq 50° \quad (2A).$$

More preferably, the condition below is satisfied:

$$10° \leq \theta a \leq 40° \quad (2B).$$

Feature 2 defines the degree of rise of the side surface 34 of the shoulder land portion 23.

Feature 3

The condition below is satisfied:

$$D/C \leq 0.80 \quad (3).$$

Feature 3 stipulates that the circumferential main groove 10 (shoulder main groove 12) is not arranged in 20% of the outer side of the distance C (half of the ground contact width).

Feature 4

In the meridian cross section of the tire 1, the bottom portion 12B of the shoulder main groove 12 has an arc shape. A radius of curvature R of the bottom portion 12B is 2.0 mm or greater. That is, the condition below is satisfied:

$$2.0 \leq R \quad (4A).$$

More preferably, the condition below is satisfied:

$$2.0 \leq R \leq 5.0 \quad (4B).$$

Feature 4 stipulates that preferably the bottom portion 12B of the shoulder main groove 12 is not angular, and the radius of curvature R thereof is large.

Feature 5

The condition below is satisfied:

$$2.0 \leq E/B \leq 5.0 \quad (5).$$

Feature 5 defines the ratio between the groove depth B and the distance E.

Feature 6

The condition below is satisfied:

$$5° \leq \theta b \leq 45° \quad (6A).$$

More preferably, the condition below is satisfied:

$$5° \leq \theta b \leq 20° \quad (6B).$$

Feature 6 defines the degree of rise of the side wall portion 12Sb outward in the tire lateral direction on the inner surface of the shoulder main groove 12.

Feature 7

The condition below is satisfied:

$$12 \text{ mm} \leq B \leq 25 \text{ mm} \quad (7C).$$

More preferably, the condition below is satisfied:

$$15 \text{ mm} \leq B \leq 17 \text{ mm} \quad (7D).$$

Feature 7 defines an absolute value of the groove depth B.

Feature 8 The condition below is satisfied:

$$0.80 \leq F/G \leq 1.30 \quad (8).$$

Feature 8 defines the ratio of the dimension of the ground contact surface 31 of the center land portion 21 in the tire lateral direction to the dimension of the ground contact surface 33 of the shoulder land portion 23.

Feature 9

The condition below is satisfied:

$$1.5 \leq F/B \leq 4.0 \quad (9).$$

Feature 9 defines the ratio between the dimension of the ground contact surface 33 of the shoulder land portion 23 in the tire lateral direction and the groove depth B.

Feature 10

The conditions below are satisfied:

$$J > K \quad (10A);$$

$$J > L \quad (10B); \text{ and}$$

$$0.05 \leq (K-L)/(J-L) \leq 0.85 \quad (10C).$$

Feature 10 defines a shoulder drop amount of the profile of the ground contact surface 30 of the tread portion 2.

Feature 11

The condition below is satisfied:

$$1.0 \leq N/B \leq 1.4 \quad (11).$$

Feature 11 defines the relationship between the distance N between the ground contact surface 33 of the shoulder land portion 23 and the third belt ply 63, and the groove depth B of the shoulder main groove 12.

Feature 12

Given Hs as a hardness indicating a resistance to denting of the cap tread rubber 82 at room temperature (23° C.), and tan δ as a loss coefficient indicating a ratio between a storage shear elastic modulus and a loss shear elastic modulus of the cap tread rubber 82 at 60° C., the conditions below are satisfied:

$$60 \leq Hs \quad (12A); \text{ and}$$

$$0.23 \geq \tan \delta \quad (12B).$$

More preferably, the conditions below are satisfied:

$$65 \leq Hs \leq 75 \quad (12C); \text{ and}$$

$$0.05 \leq \tan \delta \leq 0.23 \quad (12D).$$

Feature 12 defines the physical properties of the cap tread rubber 82 of the tread rubber 8 where the circumferential main groove 10 and the land portion 20 are formed.

Feature 13

Given Md as the modulus during 30% elongation indicating a tensile stress required to elongate the cap tread rubber 82 by 300%, the following condition is satisfied:

$$9.0 \text{ MPa} \leq Md \leq 17.1 \text{ MPa} \quad (13A).$$

Further, given TB as a tensile strength indicating the maximum tensile stress required to pull and rupture the cap tread rubber 82 at 100° C., the following condition is satisfied:

$$13.0 \text{ MPa} \leq TB \leq 23.3 \text{ MPa} \quad (13B).$$

Further, given EB as a tensile elasticity indicating an elongation ratio during rupture of the cap tread rubber 82 at 100° C., the following condition is satisfied:

$$444 \text{ MPa} \leq EB \leq 653 \text{ MPa} \quad (13C).$$

Further, the hardness Hs of the undertread rubber 81 at room temperature is preferably less than the hardness Hs of the cap tread rubber 82. Further, the hardness Hs of the side rubber 9 at room temperature is preferably less than the hardness Hs of the cap tread rubber 82 and the hardness Hs of the undertread rubber 81.

Further, the tan δ at the undertread rubber 81 at 60° C. is preferably less than the tan δ at the cap tread rubber 82.

Further, the tan δ at the side rubber 9 at 60° C. is preferably less than the tan δ at the cap tread rubber 82.

Further, the modulus MD during 300% elongation of the undertread rubber 81 is preferably less than or equal to the modulus Md during 300% elongation of the cap tread rubber 82. Further, the modulus MD during 300% elongation of the side rubber 9 is preferably less than the modulus Md during 300% elongation of the cap tread rubber 82.

Further, the tensile strength TB of the undertread rubber 81 at 100° C. is preferably less than the tensile strength TB of the cap tread rubber 82. Further, the tensile strength TB of the side rubber 9 at 100° C. is preferably less than the tensile strength TB of the cap tread rubber 82.

Further, the tensile elasticity EB of the undertread rubber 81 at 100° C. is preferably less than the tensile elasticity EB of the cap tread rubber 82. Further, the tensile elasticity EB of the side rubber 9 at 100° C. is preferably equal to the tensile elasticity EB of the undertread rubber 81.

The preferred values of the hardness HS at room temperature, the modulus Md during 300% elongation, the tensile strength TB at 100° C., the tensile elasticity EB at 100° C., and the tan δ at 60° C. of the cap tread rubber 82, the undertread rubber 81, and the side rubber 9 are as shown in Table 1 below. That is, Table 1 summarizes features 12 and 13. Note that the values in parentheses in Table 1 indicate the values of the tire 1 actually created.

TABLE 1

| Cap tread rubber | Hardness Hs | From 60 to 75, inclusive (65) |
| --- | --- | --- |
| | Modulus Md during elongation (MPa) | From 9.0 to 17.1, inclusive (14.5) |
| | Tensile strength TB (MPa) | From 13.0 to 23.3, inclusive (23.3) |
| | Tensile elasticity EB (MPa) | From 444 to 653, inclusive (600) |
| | tan δ | From 0.05 to 0.23, inclusive (0.21) |
| Undertread rubber | Hardness Hs | 60 (60) |
| | Modulus Md during elongation (MPa) | 14.4 (14.4) |
| | Tensile strength TB (MPa) | From 20.1 to 21.3, inclusive (21.3) |
| | Tensile elasticity EB (MPa) | From 555 to 576, inclusive (555) |
| | tan δ | 0.12 (0.12) |
| Side rubber | Hardness Hs | From 52 to 58, inclusive (55) |
| | Modulus Md during elongation (MPa) | From 5.5 to 10.5, inclusive (7.5) |
| | Tensile strength TB (MPa) | From 16.0 to 25.0, inclusive (20.0) |
| | Tensile elasticity EB (MPa) | From 500 to 700, inclusive (600) |
| | tan δ | From 0.10 to 0.18, inclusive (0.14) |

Feature 14

Given BP as the number of belt cords disposed per 50 mm, the condition below is satisfied in each of the belt plies 61, 62, 63, and 64:

$$20 \text{ cords} \leq BP \leq 30 \text{ cords} \tag{14}$$

Feature 15 Given Mbp as the modulus during 100% elongation indicating the tensile stress required to elongate the belt rubber of each of the belt plies 61, 62, 63, 64 in a new product, the following condition is satisfied:

$$5.5 \text{ MPa} \leq Mbp \tag{15}$$

Feature 16

The condition below is satisfied:

$$0.76 \leq C/H \leq 0.96 \tag{16}$$

Feature 16 defines the ratio of the value of half of the ground contact width to the value of half of the total width.

Feature 17

The conditions below are satisfied:

$$45° \leq \theta c \leq 70° \tag{17A}$$

and $$45° \leq \theta d \leq 70° \tag{17B}$$

Note that, as described above, the inclination direction of the belt cords of the second belt ply 62 and the inclination direction of the belt cords of the third belt ply 63 are different.

The belt cords of the first belt ply 61 and the belt cords of the second belt ply 62 incline in the same direction. That is, the first belt ply 61 and the second belt ply 62 are layered so that the belt cords of the first belt ply 61 and the belt cords of the second belt ply 62 incline in the same direction. Given θe as the inclination angle of the belt cords of the first belt ply 61 with respect to the tire equator line, the condition below is satisfied:

$$45° \leq \theta e \leq 70° \tag{17C}$$

Feature 18

The condition below is satisfied:

$$1.0 \leq F/U \tag{18}$$

Feature 18 defines the ratio between the dimension of the ground contact surface 33 of the shoulder land portion 23 in the tire lateral direction and the dimension of the recessed portion 40 provided to the side surface 34 of the shoulder land portion 23.

Feature 19

The condition below is satisfied:

$$0.10 \leq U/V \leq 0.60 \tag{19}$$

Feature 19 defines the ratio of the dimension of the recessed portion 40 provided to the side surface 34 of the shoulder land portion 23 to the dimension of the interval of the recessed portion 40.

Feature 20

The condition below is satisfied:

$$5 \text{ mm} \leq U \leq 20 \text{ mm} \tag{20}$$

Feature 20 defines an absolute value of the dimension of the recessed portion 40.

Feature 21

The condition below is satisfied:

$$3 \leq F/W \leq 10 \tag{21}$$

Feature 21 defines the ratio between the dimension of the ground contact surface 33 of the shoulder land portion 23 in the tire lateral direction to the dimension of the interval of the sipe 41 provided to the side surface 34 of the shoulder land portion 23. The ratio between the dimension of the ground contact surface 33 and the dimension of the interval of the sipes 41 is regulated, making it possible to regulate the ease of deformation of the shoulder land portion 23.

Feature 22

The condition below is satisfied:

$$0.10 \leq M/B \leq 0.75 \tag{22}$$

Feature 22 defines the ratio of the distance M of the tread rubber 8 directly below the shoulder main groove 12 to the groove depth B.

Feature 23

The condition below is satisfied:

$$0.75 \leq Q/C \leq 0.95 \qquad (23).$$

Feature 23 defines the ratio between the value of half of the width of the third belt ply 63 and the value of half of the ground contact width.

Feature 24

The end portion of the belt layer 6 in the tire lateral direction is disposed inward or outward of the shoulder land portion 23 in the tire lateral direction. That is, the end portions of the belt plies 61, 62, 63, 64 are not disposed directly below the shoulder main groove 12. In the present embodiment, the end portion of the fourth belt ply 64 in the tire lateral direction is disposed inward of the opening end portion 12Ka in the tire lateral direction, the opening end portion 12Ka being inward of the shoulder main groove 12 in the tire lateral direction. The end portions of the first, second, and third belt plies 61, 62, 63 in the tire lateral direction are disposed outward of the opening end portion 12Kb in the tire lateral direction, the opening end portion 12Kb being outward of the shoulder main groove 12 in the tire lateral direction.

Actions and Effects

According to the present embodiment, satisfaction of at least feature 1 of features 1 to 24 described above suppresses excessive deformation of the shoulder land portion 23 when the tire 1, mounted onto a vehicle, swivels or runs onto a curb.

Figure 6:
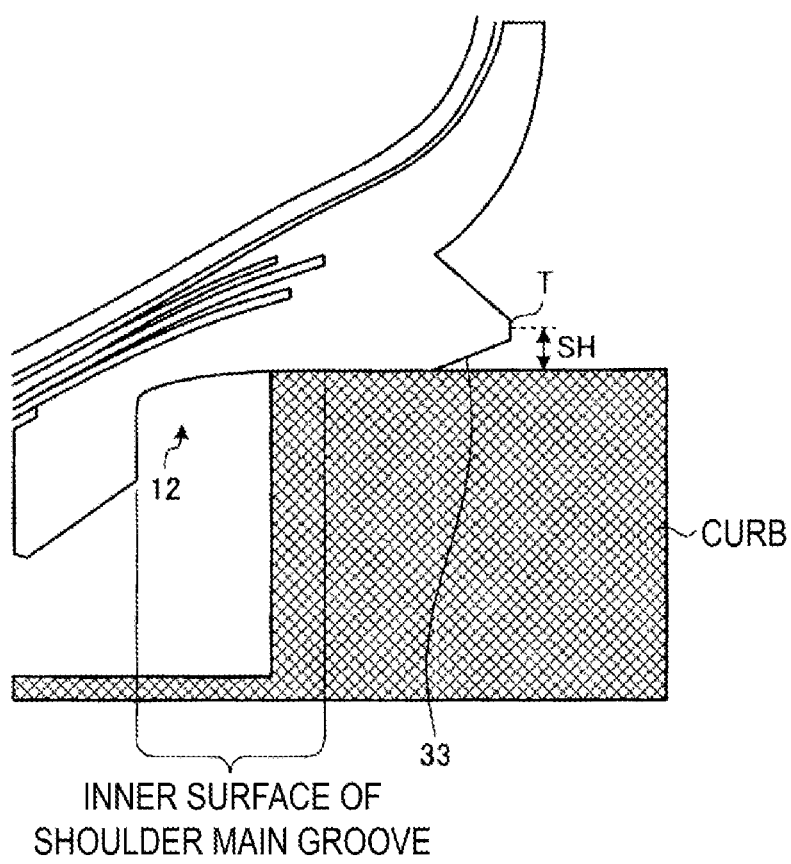
FIG. 6 is a schematic view for explaining warping of the tire according to the present embodiment.

The present inventors created tires that satisfy and tires that do not satisfy the features described above as evaluation test tires, mounted the evaluation test tires onto vehicles, and implemented the evaluation tests by running the vehicles onto a curb. FIG. 6 is a schematic diagram for explaining the evaluation test. As illustrated in FIG. 6, the shoulder land portion 23 on a vehicle outer side of the tire for the evaluation test mounted onto the vehicle was run onto a curb. For each evaluation test tire, an amount of deformation of the shoulder land portion 23 when the shoulder land portion 23 on the vehicle outer side was run onto a curb was measured. As illustrated in FIG. 6, according to the structure of the tire, the shoulder land portion 23 deforms, turning upward, and the ground contact surface 33 of the shoulder land portion 23 warps. As the amount of deformation of the shoulder land portion 23, a distance SH between an upper surface of the curb and the ground contact edge T of the warped ground contact surface 33 in the vertical direction was measured. Note that the upper surface of the curb is substantially parallel with the horizontal plane. In the description below, the distance SH between the upper surface of the curb and the ground contact edge T of the warped ground contact surface 33 in the vertical direction is called the warp amount SH.

A large size of the warp amount SH means that the shoulder land portion 23 is excessive deformed. When the warp amount SH is large, the likelihood of cracks in the inner surface of the shoulder main groove 12, damage to the shoulder land portion 23, and a phenomenon called a rib tear increases. A rib tear is a phenomenon in which a portion of the tread rubber 8 tears or becomes damaged due to the action of an external force. A smaller warp amount SH is preferred from the viewpoint of suppressing cracks in the inner surface of the shoulder main groove 12, suppressing damage to the shoulder land portion 23, and suppressing rib tear occurrence.

Figure 7:
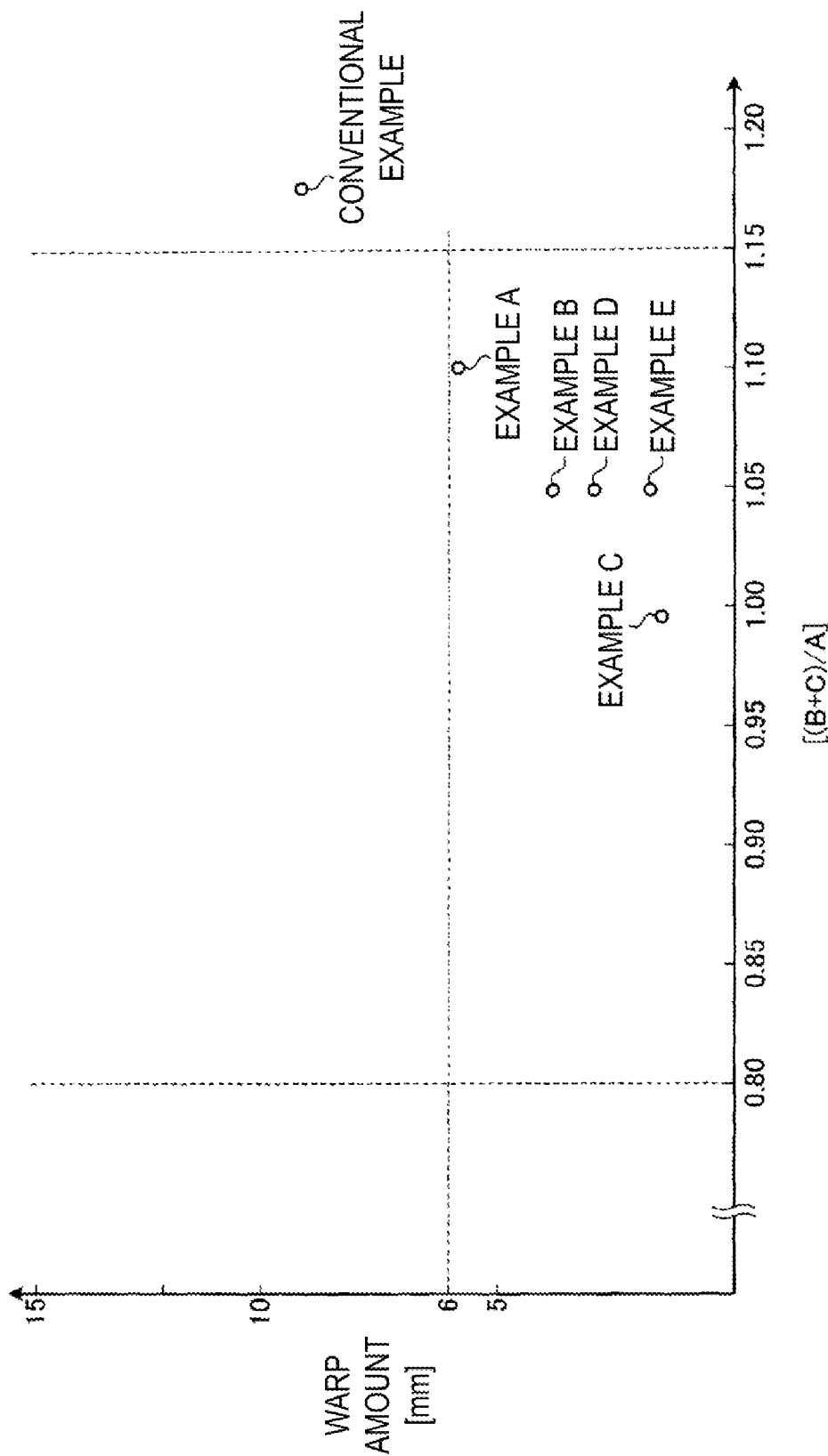
FIG. 7 is a graph showing a relationship between the warping of the tire and features according to the present embodiment.

FIG. 7 shows the test results of the warp amount SH of the tire of each evaluation test. The horizontal axis of the graph in FIG. 7 indicates the value of feature 1. The vertical axis of the graph in FIG. 7 indicates the warp amount SH. When the warp amount SH is greater than 6 mm, the possibility of cracks in the inner surface of the shoulder main groove 12, damage to the shoulder land portion 23, and rib tear occurrence increases. When the warp amount SH is 6 mm or less, suppression of cracks in the inner surface of the shoulder main groove 12, suppression of damage to the shoulder land portion 23, and suppression of rib tear occurrence can be expected.

As illustrated in FIG. 7, the tire according to the Conventional Example does not satisfy the condition of feature 1, and the value of (B+C)/A is greater than 1.15. The tire according to Examples A, B, C, D, and E satisfy the condition of feature 1. The warp amount SH of the tire according to the conventional example is greater than 6 mm. The warp amount SH of the tires according to the examples A, B, C, D, and E is less than 6 mm.

As described with reference to FIG. 6, when the tire 1 swivels or runs onto a curb, causing the shoulder main groove 12 to expand, the inner surface of the shoulder main groove 12 comes into contact with the upper surface of the curb, and the shoulder land portion 23 becomes outwardly displaced in the tire lateral direction (on the vehicle outer side). When the groove depth B is excessively deep, the distance C (half of the ground contact width) is excessively large, or the distance A is excessively small, causing the value of (B+C)/A to increase, the shoulder land portion 23 is thought to warp more easily. The present inventors found that the warping of the shoulder land portion 23 can be suppressed by setting the value of (B+C)/A to 1.15 or less.

The tires according to Examples A, B, and C satisfy the condition of feature 1, but do not satisfy the conditions of features 2 to 24. As understood from Examples A, B, and C, the warp amount SH decreases in proportion to the decrease in the value of (B+C)/A.

Example D is a tire that satisfies the conditions of feature 1, feature 2, and feature 3. The value of (B+C)/A of the tire according to Example B and the value of (B+C)/A of the tire according to Example D are substantially equal. The warp amount SH of the tire according to Example D is less than the warp amount SH of the tire according to Example B.

Feature 2 defines the degree of rise of the side surface 34 of the shoulder land portion 23. Feature 3 stipulates that the shoulder main groove 12 is not arranged in 20% of the outer side of the distance C (half of the ground contact width). Satisfaction of the conditions:

$$5° \leq \theta a \leq 50° \qquad (2A); \text{ and}$$

$$D/C \leq 0.80 \qquad (3),$$

which are features 2 and 3, makes it possible to suppress the warp amount SH of the tire.

Example E is a tire that satisfies the conditions of feature 1, feature 2, feature 3, feature 4, feature 5, feature 6, feature 7, feature 12, and feature 13. The value of (B+C)/A of the tire according to Example B, the value of (B+C)/A of the tire according to Example D, and the value of (B+C)/A of the tire according to Example E are substantially equal. The warp amount SH of the tire according to Example E is less than the warp amount SH of the tire according to Example B and less than the warp amount SH of the tire according to Example D.

With satisfaction of the condition of feature 4, the warping of the shoulder land portion 23, the occurrence of cracks in the bottom portion 12B of the shoulder main groove 12, and the occurrence of rib tears are suppressed.

Further, with satisfaction of the condition of feature 5, the warping of the shoulder land portion 23 with the swivel of the tire is suppressed, and the steering stability performance is improved. When the value of E/B is greater than 5.0, the rigidity of the shoulder land portion 23 is greater than the rigidity of the center land portion 21, and a behavior linearity of the vehicle with respect to steering deteriorates. When the value of E/B is less than 2.0, the rigidity of the shoulder land portion 23 decreases extensively and, with the swivel of the tire 1, the possibility of warping of the shoulder land portion 23 increases. With the warping of the shoulder land portion 23, the steering stability performance with the swivel of the tire 1 decreases.

Further, with satisfaction of the condition of feature 6, the occurrence of cracks on the inner surface of the shoulder main groove 12, and the occurrence of rib tears are suppressed.

Further, with satisfaction of the condition of feature 7 as well, the occurrence of cracks on the inner surface of the shoulder main groove 12, and the occurrence of rib tears are suppressed.

Further, the physical properties of the cap tread rubber 82, the undertread rubber 81, and the side rubber 9 are determined so as to satisfy the conditions of features 12, 13, thereby suppressing the warping of the shoulder land portion 23, the occurrence of cracks on the inner surface of the shoulder main groove 12, damage to the shoulder land portion 23, and the occurrence of rib tears.

Further, according to the present embodiment, the conditions:

$$0.80 \leq (B+C)/A \leq 1.15 \quad (1A); \text{ and}$$

$$0.75 \leq Q/C \leq 0.95 \quad (23),$$

which are feature 1 and feature 23, are satisfied, making it possible to prevent damage to the tread rubber 8 and improve a belt separation resistance performance of the tire 1 while suppressing a decrease in wear resistance performance of the tire 1. The belt separation resistance performance refers to performance that allows suppression of the occurrence of separation (so-called belt separation) that originates at the end portion of the belt layer 6.

A large (B+C)/A value means that the volume of the cap tread rubber 82 is large. A small (B+C)/A value means that the volume of the cap tread rubber 82 is small. When the value of (B+C)/A is greater than 1.15, the volume of the cap tread rubber 82 becomes excessively large, obstructing heat build-up of the tread rubber 8 with the running of the tire 1, and increasing the temperature of the tread rubber 8. As a result, the belt layer 6 becomes more susceptible to separation, decreasing belt separation resistance performance. When the value of (B+C)/A is less than 0.80, the volume of the cap tread rubber 82 is excessively small. As a result, the wear resistance performance of the tire 1 deteriorates.

A large Q/C value means that the dimension of the belt layer 6 (third belt ply 63) in the tire lateral direction is excessively large. When the value of Q/C is greater than 0.95, the movement of the end portion of the belt layer 6 becomes excessively large, decreasing the durability of the belt layer 6. A small Q/C value means that the dimension of the belt layer 6 (third belt ply 63) in the tire lateral direction is excessively small. The belt layer 6 functions as a hoop that tightens the carcass 5. When the value of Q/C is smaller than 0.75, the dimension of the belt layer 6 in the tire lateral direction becomes excessively small, increasing the possibility that the belt layer 6 will not be capable of sufficiently exhibiting the function as a hoop (the hoop effect). Further, the durability of the belt layer 6 may decrease.

According to the present embodiment, the conditions of feature 1 and feature 23 are satisfied, making it possible to prevent damage to the tread rubber 8 and improve the belt separation resistance performance of the tire 1 while suppressing a decrease in wear resistance performance of the tire 1.

Further, according to the present embodiment, the condition $$1.0 \leq N/B \leq 1.4 \quad (11),$$

which is feature 11, is satisfied, improving the durability of the belt layer 6. An N/B value greater than 1.4 means that the volume of the cap tread rubber 82 of the shoulder land portion 23 is excessively large. When the volume of the cap tread rubber 82 is excessively large, the heat build-up of the cap tread rubber 8 is obstructed and, as a result, the durability of the belt layer 6 deteriorates. An N/B value less than 1.0 means that a thickness of the cap tread rubber 82 of the shoulder land portion 23 is excessively small. When the thickness of the cap tread rubber 82 is excessively small, the end portion of the belt layer 6 of the tread portion 2 is exposed in terminal stages of wear and, as a result, the durability of the belt layer 6 deteriorates.

Further, according to the present embodiment, the condition of feature 24 is satisfied. The end portions of the belt plies 61, 62, 63, and 64 are not disposed directly below the shoulder main groove 12, thereby suppressing distortion of the belt layer 6. As a result, the belt separation resistance performance improves.

Further, according to the present embodiment, the condition $$20 \text{ cords} \leq BP \leq 30 \text{ cords} \quad (14),$$

which is feature 14, is satisfied. When the number of belt cords BP disposed per 50 mm is greater than 30 cords, the ratio of belt cords to the belt rubber increases, making it more difficult to achieve favorable followability of the deformation of the tread rubber 8. As a result, belt separation resistance performance deteriorates. When the number of belt cords BP is less than 20 cords, the hoop effect of the belt layer 6 decreases and the amount of deformation of the belt layer 6 becomes excessive, deteriorating the belt separation resistance performance. With satisfaction of the condition of feature 14, the belt separation resistance performance is improved.

Further, according to the present embodiment, the condition $$5.5 \text{ MPa} \leq Mbp \quad (15),$$

which is feature 15, is satisfied. As a result, edge separation resistance performance is improved.

Further, with satisfaction of the condition of feature 1, the tearing and chipping of the tread rubber 8 are suppressed, even when the shoulder land portion 23 comes into contact with a curb. When the value of (B+C)/A is greater than 1.15, the shoulder land portion 23 moves readily and, upon contact with a curb, readily tears. When the value of (B+C)/A is less than 0.80, a ground contact pressure of the shoulder land portion 23 increases and the shoulder land portion 23 readily chips upon contact with a curb. With satisfaction of the condition of feature 1, the tearing and chipping of the tread rubber 8 are suppressed, even when the shoulder land portion 23 comes into contact with a curb.

Further, with satisfaction of the condition of feature 2, the tearing and chipping of the tread rubber 8 are even more effectively suppressed, even when the shoulder land portion 23 comes into contact with a curb. When the angle θa is greater than 50°, the ground contact pressure of the shoulder land portion 23 increases and the shoulder land portion 23 readily chips upon contact with a curb. When the angle θa is less than 5°, the shoulder land portion 23 moves readily and, upon contact with a curb, readily tears. With satisfaction of the condition of feature 2, the tearing and chipping of the tread rubber 8 are even more effectively suppressed, even when the shoulder land portion 23 comes into contact with a curb.

Further, with satisfaction of the condition of feature 3, the shoulder main groove 12 is not disposed in the outer 20% side of the distance C, thereby suppressing excessive movement of the shoulder land portion 23.

Further, according to the present embodiment, the condition of feature 16 is satisfied. When the condition of feature 16 is not satisfied and the value of C/H is greater than 0.96 or the value of C/H is less than 0.76, there is an increased possibility that the stability of the tread portion 2 will decrease and the tread rubber 8 and the side rubber 9 will move excessively with the running of the tire 1. When the tread rubber 8 and the side rubber 9 excessively move, a rolling resistance of the tire 1 deteriorates. With satisfaction of the condition of feature 16, the behavior of the tread rubber 8 and the side rubber 9 when the ground contact surface 30 of the tread portion 2 comes into contact with the road surface stabilizes, and the ground contact surface 30 comes into contact with the road surface in a stable manner. Thus, the rolling resistance of the tire 1 decreases.

Further, according to the present embodiment, the condition of feature 22 is satisfied. A large M/B value means that the volume of the tread rubber 8 that exists directly below the shoulder main groove 12 is excessively large. A small M/B value means that the volume of the tread rubber 8 that exists directly below the shoulder main groove 12 is excessively small. When the value of M/B is greater than 0.75, heat build-up of the tread rubber 8 with running of the tire 1 is obstructed. As a result, the rolling resistance of the tire 1 deteriorates. When the value of M/B is less than 0.10, the wear resistance performance of the tread portion 2 decreases, increasing the possibility of exposure of the belt layer 6 in the terminal stages of wear of the tread portion 2. With satisfaction of the condition of feature 22, it is possible to suppress a decrease in wear resistance performance and decrease tire rolling resistance.

Further, according to the present embodiment, the conditions of feature 12 are satisfied. When the hardness Hs is less than 60, the tread rubber 8 (cap tread rubber 82) moves excessively with the running of the tire 1, causing the rolling resistance of the tire 1 to increase. When tan δ is greater than 0.23, the rolling resistance of the tire 1 increases. With satisfaction of the condition of feature 12, the rolling resistance of the tire 1 can be decreased.

Further, with satisfaction of the condition of feature 8, the rigidity difference between the center portion of the tread portion 2 that includes the center land portion 21, and the shoulder portion of the tread portion 2 that includes the shoulder land portion 23 decreases, thereby suppressing the occurrence of uneven wear in the shoulder portion. When the value of F/G is greater than 1.30, the rigidity of the shoulder portion becomes excessively large, decreasing the shoulder wear resistance performance. When the value of F/G is less than 0.80, the rigidity of the shoulder portion becomes excessively small, decreasing the shoulder wear resistance performance in this case as well.

Further, similarly, with satisfaction of the condition of feature 9, a decrease in shoulder wear resistance performance can be suppressed. When the value of F/B is greater than 4.0, the rigidity of the shoulder land portion 23 becomes excessively large, decreasing the shoulder wear resistance performance. When the value of F/B is less than 1.5, the rigidity of the shoulder portion becomes excessively small, decreasing the shoulder wear resistance performance in this case as well.

Further, similarly, with satisfaction of the condition of feature 10, a decrease in shoulder wear resistance performance can be suppressed. When the value of (K–L)/(J–L) is greater than 0.85, the rigidity of the shoulder portion becomes excessively small, decreasing the shoulder wear resistance performance. When the value of (K–L)/(J–L) is less than 0.05, the rigidity of the shoulder portion becomes excessively large, decreasing the shoulder wear resistance performance in this case as well.

Further, similarly, with satisfaction of the condition of feature 17, ride comfort is enhanced. Further, the durability of the belt layer 6 is improved.

Further, with satisfaction of the condition of feature 18, the warping of the shoulder land portion 23 is suppressed. A large dimension U of the recessed portion 40 and an F/U value that is less than 1.0 mean that the rigidity of the shoulder land portion 23 decreases. As a result, with the swivel of the tire 1, the shoulder land portion 23 readily warps. Further, when the dimension U of the recessed portion 40 is large, the shoulder land portion 23 warps and the ground contact area decreases, making it no longer possible to achieve a sufficient cornering force. Further, with satisfaction of the condition of feature 18, the warping of the shoulder land portion 23 with the swivel of the tire 1 is suppressed, and ride comfort is enhanced.

Further, similarly, with satisfaction of the condition of feature 19, deformation of the shoulder land portion 23 and warping of the shoulder land portion 23 with the swiveling or running onto a curb of the tire 1 are suppressed.

Further, similarly, with satisfaction of the condition of feature 21, deformation of the shoulder land portion 23 and warping of the shoulder land portion 23 with the swiveling or riding onto a curb of the tire 1 are suppressed.

EXAMPLES

Tires that satisfy and tires that do not satisfy the conditions of feature 1, feature 23, feature 11, feature 24, feature 14, and feature 15 described above were evaluated for (1) belt separation resistance performance, and (2) wear resistance performance. Test tires with tire size 295/80R22.5 were filled to a maximum internal pressure defined by JATMA, mounted onto a large bus vehicle, run at a vehicle speed of 80 km/hour on a test course for a distance of 100,000 km, and measured with respect to rubber characteristics (rupture elongation) between the end portions of the second belt ply 62 and the third belt ply 63 that form the cross ply belt layer. Additionally, the groove depth of the circumferential main groove 10 after running was measured. With the test tires mounted onto the large bus vehicle, a load equivalent to 70% of the maximum load defined by JATMA was applied to the test tires. The evaluation was expressed by using the evaluation result of the tire according to the Conventional Example that does not satisfy any of the conditions of feature 1, feature 23, feature 11, feature 24, feature 14, or feature 15 as an index value of 100 (standard). In this evaluation, larger values are preferred.

FIGS. 8A-8B show the results of the evaluation test. Examples 1, 2, and 3 are tires that satisfy the condition of feature 1, but do not satisfy the conditions of feature 23, feature 11, feature 24, feature 14, and feature 15. In Examples 1, 2, and 3, the value of (B+C)/A is varied within the range of feature 1.

Examples 4, 5, and 6 are tires that satisfy the conditions of feature 1 and feature 23, but do not satisfy the conditions of feature 11, feature 24, feature 14, and feature 15. In Examples 4, 5, and 6, the value of Q/C is varied within the range of feature 23. Note that, in Examples 4, 5, and 6, the value of (B+C)/A was 1.00.

Examples 7, 8, and 9 are tires that satisfy the conditions of feature 1, feature 23, and feature 11, but do not satisfy the conditions of feature 24, feature 14, and feature 15. In Examples 7, 8, and 9, the value of N/B is varied within the range of feature 11. Note that, in Examples 7, 8, and 9, the value of (B+C)/A was 1.00, and the value of Q/C was 0.85.

Example 10 is a tire that satisfies the conditions of feature 1, feature 23, feature 11, and feature 24, but does not satisfy the conditions of feature 14, and feature 15. Note that, in Example 10, the value of (B+C)/A was 1.00, the value of Q/C was 0.85, and the value of N/B was 1.2.

Examples 11, 12, and 13 are tires that satisfy the conditions of feature 1, feature 23, feature 11, feature 24, and feature 14, but do not satisfy the condition of feature 15. In Examples 11, 12, and 13, the value of BP is varied within the range of feature 14. Note that, in Examples 11, 12, and 13, the value of (B+C)/A was 1.00, the value of Q/C was 0.85, and the value of N/B was 1.2.

Example 14 is a tire that satisfies all of the conditions of feature 1, feature 23, feature 11, feature 24, feature 14, and feature 15. In Example 14, the value of (B+C)/A was 1.00, the value of Q/C was 0.85, the value of N/B was 1.2, and the value of Mbp was 5.8.

As shown in FIGS. 8A-8B, it can be confirmed that belt separation resistance performance improves in proportion to the increase in the number of features satisfied among feature 1, feature 23, feature 11, feature 24, feature 14, and feature 15. Further, it can be confirmed that wear resistance performance was maintained.

Other Embodiments

Figure 9:
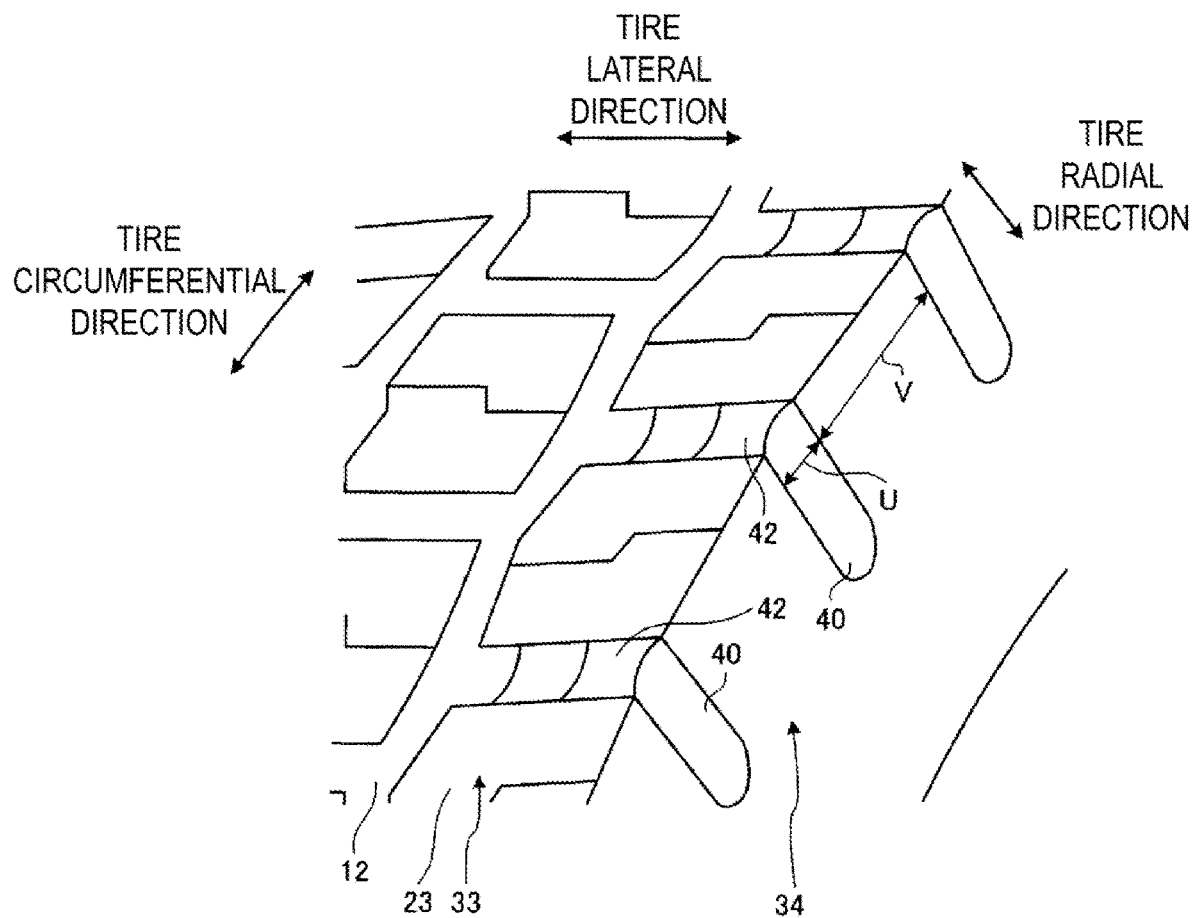
FIG. 9 is a perspective view illustrating a modified example of a shoulder land portion according to an embodiment.
Figure 10:
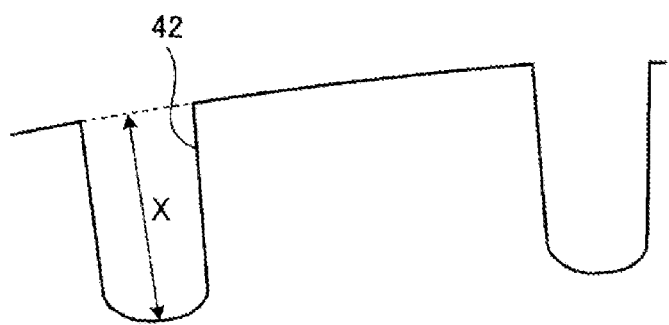
FIG. 10 is a side view of the shoulder land portion illustrated in FIG. 9.

FIG. 9 is a perspective view illustrating a modified example of the shoulder land portion 23. FIG. 10 is a side view of the shoulder land portion 23 illustrated in FIG. 9. In the embodiment described above, the shoulder land portion 23 was a rib serving as a continuous land portion. In the present embodiment, a lug groove 42 connected to the recessed portion 40 is provided to the ground contact surface 33 of the shoulder land portion 23. With the lug groove 42 provided, the shoulder land portion 23 is a block row serving as a discontinuous land portion. Note that while the sipe (41) is not provided to the side surface 34 in the present embodiment, the sipe (41) may be provided.

As illustrated in FIG. 10, the groove depth of the lug groove 42 is defined as a groove depth X. The groove depth X of the lug groove 42 is a distance between an opening end portion of the lug groove 42 in the tire radial direction and a bottom portion of the lug groove 42.

Further, the number of recessed portions 40 provided in the tire circumferential direction is defined as a number Y.

Feature 25 The condition below is satisfied:

$$2 \text{ mm} \leq X \leq 28 \text{ mm} \quad (25).$$

Feature 26

The condition below is satisfied:

$$35 \leq Y \leq 60 \quad (26).$$

In the present embodiment as well, it is possible to provide the tire 1 capable of preventing damage to the tread rubber 8 and capable of improving belt separation resistance performance while maintaining wear resistance performance.

The invention claimed is:

1. A pneumatic tire that rotates about a rotation axis, comprising:
   a tread portion that comprises a tread rubber;
   side portions provided to both sides in a tire lateral direction of the tread portion, each comprising a side rubber;
   a carcass; and
   a belt layer disposed outward of the carcass in a tire radial direction;
   the tread portion further comprising a plurality of circumferential main grooves provided in the tire lateral direction, each extending in a tire circumferential direction, and a plurality of land portions that are defined by the circumferential main grooves and comprise a ground contact surface that comes into contact with a road surface;
   the land portions comprising a shoulder land portion that is disposed outward in the tire lateral direction of a shoulder main groove that is closest among the plurality of circumferential main grooves to a ground contact edge of the tread portion, and comprises the ground contact edge;
   the land portions comprising a center land portion; and
   the shoulder land portion outward of the ground contact edge in the tire lateral direction comprising a surface connected to a surface of the side portion; wherein
   there are defined in a meridian cross section of the tread portion that passes through the rotation axis:
   a first imaginary line that coincides along its length with the ground contact surface;
   a second imaginary line that passes through a bottom portion of the shoulder main groove and is parallel to the first imaginary line;
   an intersection point between the second imaginary line and a surface of the shoulder land portion outward of the ground contact edge in the tire lateral direction; and
   a tire equatorial plane that is orthogonal to the rotation axis and passes through a center of the tread portion in the tire lateral direction;
   the center land portion includes the tire equatorial plane;
   given A as a distance in the tire lateral direction between the intersection point and the tire equatorial plane, B as a groove depth of the shoulder main groove, and C as a distance in the tire lateral direction between the ground contact edge and the tire equatorial plane, the condition $0.80 \leq (B+C)/A \leq 1.15$ is satisfied;
   the belt layer comprising a plurality of belt plies disposed in the tire radial direction, with two of the belt plies among the plurality of belt plies adjacent in the tire radial direction forming a cross belt ply layer;
   given Q as a distance in the tire lateral direction between the tire equatorial plane and an end portion of the belt ply that, among the two belt plies that form the cross ply belt layer, has a shorter dimension in the tire lateral direction, the condition $0.75 \leq Q/C \leq 0.95$ is satisfied; and
   given F as a distance in the tire lateral direction between an opening end portion outward of the shoulder main groove in the tire lateral direction and the ground contact edge, and G as a dimension of the center land portion in the tire lateral direction, the condition $0.80 \leq F/G \leq 1.20$ is satisfied.

2. The pneumatic tire according to claim 1, wherein given N as a distance in the tire radial direction between the ground contact surface of the shoulder land portion and an end portion of the belt ply that, among the two belt plies that form the cross ply belt layer, is disposed outward in the tire radial direction, the condition $1.0 \leq N/B \leq 1.4$ is satisfied.

3. The pneumatic tire according to claim 1, wherein an end portion of the belt layer in the tire lateral direction is disposed inward or outward of the shoulder main groove in the tire lateral direction.

4. The pneumatic tire according to claim 1, wherein
the belt ply comprises a plurality of belt cords and a belt rubber that covers the belt cords; and
given BP as a number of the belt cords disposed per 50 mm, the condition 20 cords$\leq$BP$\leq$30 cords is satisfied.

5. The pneumatic tire according to claim 4, wherein given Mbp as a modulus at 100% elongation of the belt rubber in a new product, the condition 5.5 MPa$\leq$Mbp is satisfied.

6. The pneumatic tire according to claim 1, wherein:
there are further defined in the meridian cross section a third imaginary line that passes through the ground contact edge and the intersection point, and a fourth imaginary line that is parallel with the tire equatorial plane and passes through the intersection point; and
given $\theta a$ as an angle formed by the third imaginary line and the fourth imaginary line, the condition $5° \leq \theta a \leq 50°$ is satisfied.

7. The pneumatic tire according to claim 1, wherein:
given D as a distance in the tire lateral direction between the tire equatorial plane and an opening end portion outward of the shoulder main groove in the tire lateral direction, the condition $D/C \leq 0.80$ is satisfied.

8. The pneumatic tire according to claim 1, wherein the pneumatic tire is a heavy duty tire mounted to a truck or a bus.

9. The pneumatic tire according to claim 2, wherein an end portion of the belt layer in the tire lateral direction is disposed inward or outward of the shoulder main groove in the tire lateral direction.

10. The pneumatic tire according to claim 9, wherein
the belt ply comprises a plurality of belt cords and a belt rubber that covers the belt cords; and
given BP as a number of the belt cords disposed per 50 mm, the condition 20 cords$\leq$BP$\leq$30 cords is satisfied.

11. The pneumatic tire according to claim 10, wherein given Mbp as a modulus at 100% elongation of the belt rubber in a new product, the condition 5.5 MPa$\leq$Mbp is satisfied.

12. The pneumatic tire according to claim 11, wherein:
there are further defined in the meridian cross section a third imaginary line that passes through the ground contact edge and the intersection point, and a fourth imaginary line that is parallel with the tire equatorial plane and passes through the intersection point; and
given $\theta a$ as an angle formed by the third imaginary line and the fourth imaginary line, the condition $5° \leq \theta a \leq 50°$ is satisfied.

13. The pneumatic tire according to claim 12, wherein:
given D as a distance in the tire lateral direction between the tire equatorial plane and an opening end portion outward of the shoulder main groove in the tire lateral direction, the condition $D/C \leq 0.80$ is satisfied.

14. The pneumatic tire according to claim 13, wherein the pneumatic tire is a heavy duty tire mounted to a truck or a bus.

15. The pneumatic tire according to claim 1, wherein given H as a distance in the tire lateral direction between the tire equatorial plane and the area of the side portion most outward in the tire lateral direction, the condition $0.76 \leq C/H \leq 0.96$ is satisfied.

16. The pneumatic tire according to claim 1, wherein the circumferential main grooves extend linearly in the tire circumferential direction.

17. The pneumatic tire according to claim 1, wherein five of the land portions are provided in the tire lateral direction.

18. The pneumatic tire according to claim 1, wherein the first imaginary line passes along the ground contact surface.

19. The pneumatic tire according to claim 1, wherein
a plurality of sipes are provided in the side surface of the shoulder land portion;
the sipes are provided in the tire circumferential and the each sipes extend in the tire radial direction;
given W as a dimension between the sipes adjacent in the tire circumferential direction, the condition $3 \leq F/W \leq 10$ is satisfied.

20. A pneumatic tire that rotates about a rotation axis, comprising:
a tread portion that comprises a tread rubber;
side portions provided to both sides in a tire lateral direction of the tread portion, each comprising a side rubber;
a carcass; and
a belt layer disposed outward of the carcass in a tire radial direction;
the tread portion further comprising a plurality of circumferential main grooves provided in the tire lateral direction, each extending in a tire circumferential direction, and a plurality of land portions that are defined by the circumferential main grooves and comprise a ground contact surface that comes into contact with a road surface;
the land portions comprising a shoulder land portion that is disposed outward in the tire lateral direction of a shoulder main groove that is closest among the plurality of circumferential main grooves to a ground contact edge of the tread portion, and comprises the ground contact edge;
the land portions further comprising a center land portion, the center land portion including the tire equatorial plane; and
the shoulder land portion outward of the ground contact edge in the tire lateral direction comprising a surface connected to a surface of the side portion; wherein
there are defined in a meridian cross section of the tread portion that passes through the rotation axis:
a first imaginary line that coincides along its length with the ground contact surface;
a second imaginary line that passes through a bottom portion of the shoulder main groove and is parallel to the first imaginary line;
an intersection point between the second imaginary line and a surface of the shoulder land portion outward of the ground contact edge in the tire lateral direction; and
a tire equatorial plane that is orthogonal to the rotation axis and passes through a center of the tread portion in the tire lateral direction;
given A as a distance in the tire lateral direction between the intersection point and the tire equatorial plane, B as a groove depth of the shoulder main groove, and C as a distance in the tire lateral direction between the ground contact edge and the tire equatorial plane, the condition $0.80 \leq (B+C)/A \leq 1.15$ is satisfied;
the belt layer comprising a plurality of belt plies disposed in the tire radial direction, with two of the belt plies among the plurality of belt plies adjacent in the tire radial direction forming a cross belt ply layer;

given Q as a distance in the tire lateral direction between the tire equatorial plane and an end portion of the belt ply that, among the two belt plies that form the cross ply belt layer, has a shorter dimension in the tire lateral direction, the condition $0.75 \leq Q/C \leq 0.95$ is satisfied;

given H as a distance in the tire lateral direction between the tire equatorial plane and the area of the side portion most outward in the tire lateral direction, the condition $0.76 \leq C/H \leq 0.96$ is satisfied;

a plurality of sipes are provided in the side surface of the shoulder land portion;

the sipes are provided in the tire circumferential and the each sipes extend in the tire radial direction; and given F as a distance in the tire lateral direction between an opening end portion outward of the shoulder main groove in the tire lateral direction and the ground contact edge and given W as a dimension between the sipes adjacent in the tire circumferential direction, the condition $3 \leq F/W \leq 10$ is satisfied.

* * * * *